(12) United States Patent
Lin et al.

(10) Patent No.: US 10,282,814 B2
(45) Date of Patent: May 7, 2019

(54) METHOD AND APPARATUS OF IMAGE FORMATION AND COMPRESSION OF CUBIC IMAGES FOR 360 DEGREE PANORAMA DISPLAY

(71) Applicant: MEDIATEK INC., Hsin-Chu (TW)

(72) Inventors: Hung-Chih Lin, Caotun Township, Nantou County (TW); Shen-Kai Chang, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 96 days.

(21) Appl. No.: 15/390,954

(22) Filed: Dec. 27, 2016

(65) Prior Publication Data
US 2017/0200255 A1    Jul. 13, 2017

Related U.S. Application Data

(60) Provisional application No. 62/275,818, filed on Jan. 7, 2016.

(51) Int. Cl.
*G06T 3/00* (2006.01)
*H04N 19/179* (2014.01)
(Continued)

(52) U.S. Cl.
CPC .......... *G06T 3/0037* (2013.01); *G06T 7/90* (2017.01); *H04N 5/23238* (2013.01);
(Continued)

(58) Field of Classification Search
None
See application file for complete search history.

(56) References Cited

U.S. PATENT DOCUMENTS

| | | | | |
|---|---|---|---|---|
| 4,627,622 A | * | 12/1986 | Spilhaus | A63F 9/10 273/157 R |
| 7,686,616 B1 | * | 3/2010 | Cloud | G09B 27/08 434/137 |

(Continued)

OTHER PUBLICATIONS

Zhou, M.; "AHG8: A study on compression efficiency of cube projection;" Joint Video Exploration Team (JVET) of ITU-T SH 16 WP 3 and ISO/IEC JTC 1/SC 29/WG 11; Oct. 2016; pp. 1-7.

*Primary Examiner* — Andrae S Allison
(74) *Attorney, Agent, or Firm* — McClure, Qualey & Rodack, LLP

(57) ABSTRACT

Methods and apparatus of processing cube face images are disclosed. According one method, each set of six cubic faces is converted into one rectangular assembled image by assembling each set of six cubic faces to maximize a number of continuous boundaries and to minimize a number of discontinuous boundaries. Each continuous boundary corresponds to one boundary between two connected faces with continuous contents from one face to another face. Each discontinuous boundary corresponds to one boundary between two connected faces with discontinuous contents from one face to another face. The method may further comprise applying video coding to the video sequence outputting the compressed data of the video sequence. According to another method, a fully-connected cubic-face image representing an unfolded image from the six faces of the cube is generated and the blank areas are filled with padding data to form a rectangular assembled image.

20 Claims, 27 Drawing Sheets

(51) Int. Cl.
*H04N 19/186* (2014.01)
*H04N 19/70* (2014.01)
*G06T 7/90* (2017.01)
*H04N 5/232* (2006.01)

(52) U.S. Cl.
CPC ......... *H04N 19/179* (2014.11); *H04N 19/186* (2014.11); *H04N 19/70* (2014.11); *G06T 2207/10016* (2013.01); *G06T 2207/10024* (2013.01)

(56) References Cited

U.S. PATENT DOCUMENTS

| | | | |
|---|---|---|---|
| 2002/0140702 A1 | 10/2002 | Koller | |
| 2006/0257032 A1* | 11/2006 | Nakagawa | G06T 17/20 382/232 |
| 2009/0123088 A1* | 5/2009 | Kallay | G06T 3/0062 382/295 |
| 2010/0001997 A1* | 1/2010 | Kajikawa | G06T 17/20 345/419 |
| 2015/0199839 A1* | 7/2015 | Chon | G06K 9/4633 345/427 |
| 2015/0341552 A1* | 11/2015 | Chen | H04N 5/23238 348/38 |
| 2017/0336705 A1* | 11/2017 | Zhou | G06T 3/0062 |
| 2017/0339341 A1* | 11/2017 | Zhou | H04N 5/23238 |
| 2017/0339391 A1* | 11/2017 | Zhou | H04L 65/604 |

* cited by examiner

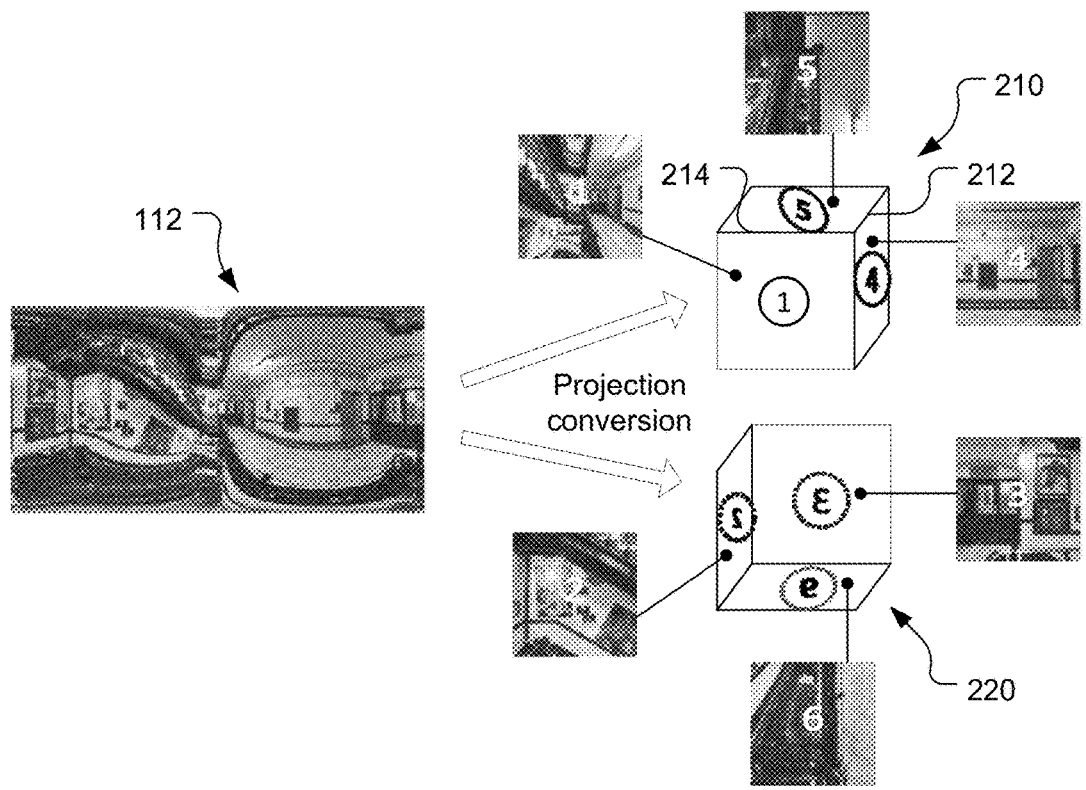
*Fig. 2A*
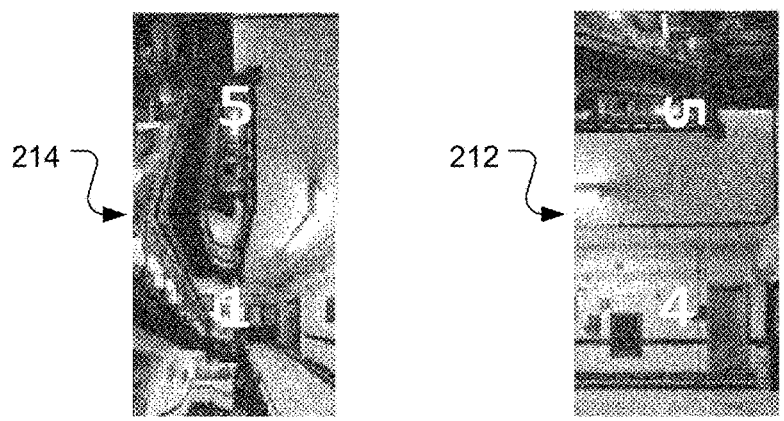
*Fig. 2B*  *Fig. 2C*

I

II

III

IV

V

VI

VII

VIII

IX

X

I

Patched area

II

Patched area

III

Patched area

IV

Patched area

V   Patched area

VI  Patched area

VII

Patched area

VIII

Patched area

IX

Patched area

X

Patched area

XI

Patched area

Before Rotation          After Rotation

III

Before Rotation          After Rotation

IV

Before Rotation    After Rotation

V

Before Rotation    After Rotation

VI

Before Rotation          After Rotation

VII

Before Rotation          After Rotation

VIII

Before Rotation                After Rotation

IX

Before Rotation                After Rotation

X

METHOD AND APPARATUS OF IMAGE FORMATION AND COMPRESSION OF CUBIC IMAGES FOR 360 DEGREE PANORAMA DISPLAY

CROSS REFERENCE TO RELATED APPLICATIONS

The present invention claims priority to U.S. Provisional Patent Application, Ser. No. 62/275,818, filed on Jan. 7, 2016. The U.S. Provisional Patent Application is hereby incorporated by reference in its entirety.

FIELD OF THE INVENTION

The present invention relates to image and video coding. In particular, the present invention relates to techniques of image processing or video compression for cubic face images converted from 360-degree panorama video.

BACKGROUND AND RELATED ART

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

Immersive video involves the capturing a scene using multiple cameras to cover a panoramic view, such as 360-degree field of view. The immersive camera usually uses a set of cameras, arranged to capture 360-degree field of view. Typically, two or more cameras are used for the immersive camera. All videos must be taken simultaneously and separate fragments (also called separate perspectives) of the scene are recorded. Furthermore, the set of cameras are often arranged to capture views horizontally, while other arrangements of the cameras are possible.

FIG. 1 illustrates an exemplary processing chain for 360-degree spherical panoramic pictures. The 360-degree spherical panoramic pictures may be captured using a 360-degree spherical panoramic camera. Spherical image processing unit 110 accepts the raw image data from the camera to form 360-degree spherical panoramic pictures. The spherical image processing may include image stitching and camera calibration. The spherical image processing are known in the field and the details are omitted in this disclosure. An example of 360-degree spherical panoramic picture from the spherical image processing unit 110 is shown in picture 112. The top side of the 360-degree spherical panoramic picture corresponds to the vertical top (or sky) and the bottom side points to ground if the camera is oriented so that the top points up. However, if the camera is equipped with a gyro, the vertical top side can always be determined regardless how the camera is oriented. In the 360-degree spherical panoramic format, the contents in the scene appear to be distorted. Often, the spherical format is projected to the surfaces of a cube as an alternative 360-degree format. The conversion can be performed by a projection conversion unit 120 to derive the six face images 122 corresponding to the six faces of a cube. On the faces of the cube, these six images are connected at the edges of the cube. Since the 360-degree image sequences may require large storage space or require high bandwidth for transmission, video encoding by a video encoder 130 may be applied to the video sequence consisting of a sequence of six-face images. At a receiver side or display side, the compressed video data is decoded using a video decoder 140 to recover the sequence of six-face images for display on a display device 150 (e.g. a VR (virtual reality) display).

FIG. 2A illustrates an example of projection conversion, where the spherical picture is projected onto the six faces of a cube. The six faces of the cube are numbered from 1 to 6. The three visible sides 210 (i.e., 1, 4 and 5) and three invisible sides 220 are shown in FIG. 2A. The orientation of each side is indicated by its corresponding side number. The side numbers in dashed circle indicate see-through images since the images are on the back sides of the cube. These six cubic faces are continuous from one face to a connected face at the connection edge. For example, face 1 is connected to face 5 at edge 214. Therefore the top edge of face 1 extends continuously into the bottom edge of face 5 as shown in FIG. 2B. In another example, face 4 is connected to right side of face 5 at edge 212. Therefore the top edge of face 4 extends continuously into the right side of face 5 as shown in FIG. 2C. A thin gap between face 1 and face 5 and between face 4 and face 5 is intended to illustrate the image boundary between two faces.

In order to allow an image processing system or a video processing system to exploit spatial and/or temporal correlation or redundancy between the six cubic faces, it is desirable to develop method to assemble these six cubic faces into an assembled rectangular image for efficient processing or compression.

BRIEF SUMMARY OF THE INVENTION

Methods and apparatus of processing cube face images are disclosed. According to one method, each set of six faces is converted into one rectangular assembled image by assembling each set of six faces to maximize a number of continuous boundaries and to minimize a number of discontinuous boundaries, and wherein each continuous boundary corresponds to one boundary between two faces with continuous contents from one face to another face and each discontinuous boundary corresponds one boundary between two faces with discontinuous contents from one face to another face. The method may further comprise applying video coding to the video sequence. In this case, the output data corresponds to compressed data of the video sequence.

The rectangular assembled image may correspond to a 6×1 assembled image. In this case, the 6×1 assembled image consists of two 3×1 connected images, each 3×1 connected image has two continuous boundaries, and the 6×1 assembled image has one discontinuous boundary between the boundary of the two 3×1 connected images. The rectangular assembled image may correspond to a 1×6 assembled image. In this case, the 1×6 assembled image consists of two 1×3 connected images, each 1×3 connected image has two continuous boundaries, and the 1×6 assembled image has one discontinuous boundary between the boundary of the two 1×3 connected images.

The rectangular assembled image may correspond to a 3×2 assembled image. In this case, the 3×2 assembled image consists of two 3×1 connected images butted at long edges of the 3×1 connected images, each 3×1 connected image has two continuous boundaries, and the 3×2 assembled image has three discontinuous boundary between the boundary of the two 3×1 connected images. The rectangular assembled image may correspond to a 2×3 assembled image. In this case, the 2×3 assembled image consists of two 1×3 connected images butted at long edges of the 1×3 connected images, each 1×3 connected image has two continuous boundaries, and the 2×3 assembled image has three discontinuous boundaries between the boundary of the two 1×3 connected images.

Each set of six faces can be converted to a rectangular assembled image by the following process: unfolding each set of six faces into a connected net; rotating one or more cubic faces of the connected net to form two connected size-3 images, three size-2 connected images, or one size-4 connected image plus two size-1 images, where size-3 image consists of three continuous faces and each size-2 image consists of two continuous faces; and assembling the two connected size-3 images or three size-2 connected images into one 6×1, 1×6, 3×2 or 2×3 rectangular assembled image, or the one size-4 connected image plus two size-1 images into one 6×1 or 1×6 rectangular assembled image.

According to another method, a fully-connected cubic-face image representing an unfolded image from the six faces of the cube is generated, where all six cubic faces are connected within the fully-connected cubic-face image and any boundary between two connected cubic faces of the fully-connected cubic-face image is continuous across the boundary. A rectangular assembled image is generated to cover the fully-connected cubic-face image by filling any blank area with padding data. Output data corresponding to a video sequence consisting of a sequence of rectangular assembled images are provided. Furthermore, video coding can be applied to the video sequence. In this case, the output data comprises compressed data of the video sequence. In one embodiment, the padding data may have pixel value corresponding to zero (black), $2^{BitDepth/2}$ (gray) or $2^{BitDepth}-1$ (white), where BitDepth is the number of bits used to indicate each color component of a pixel sample.

BRIEF DESCRIPTION OF THE DRAWINGS

FIG. 2A illustrates an example of projection conversion, where the spherical picture is projected onto the six surfaces of a cube.

FIGS. 2B-C illustrate examples of two connected faces with continuous contents across the boundary.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
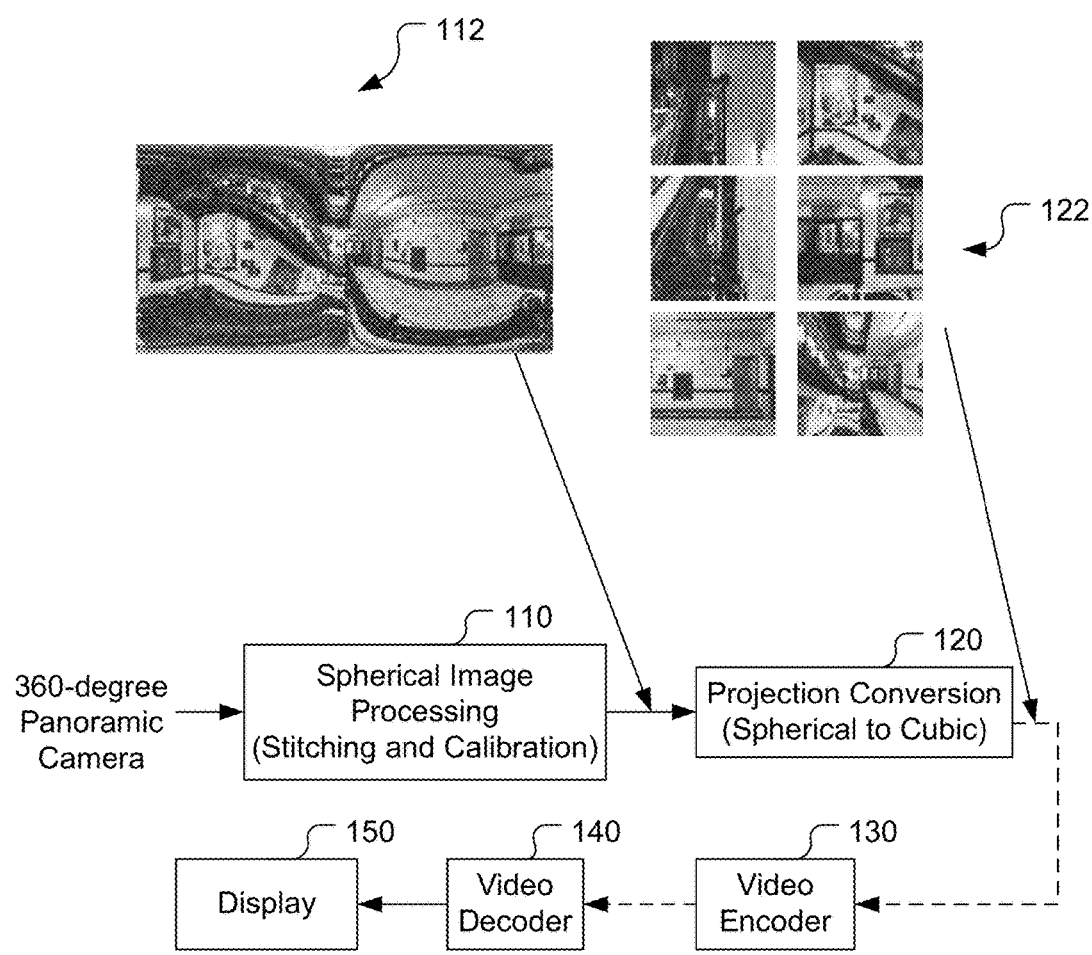
FIG. 1 illustrates an exemplary processing chain for 360-degree spherical panoramic pictures.
Figure 3A:
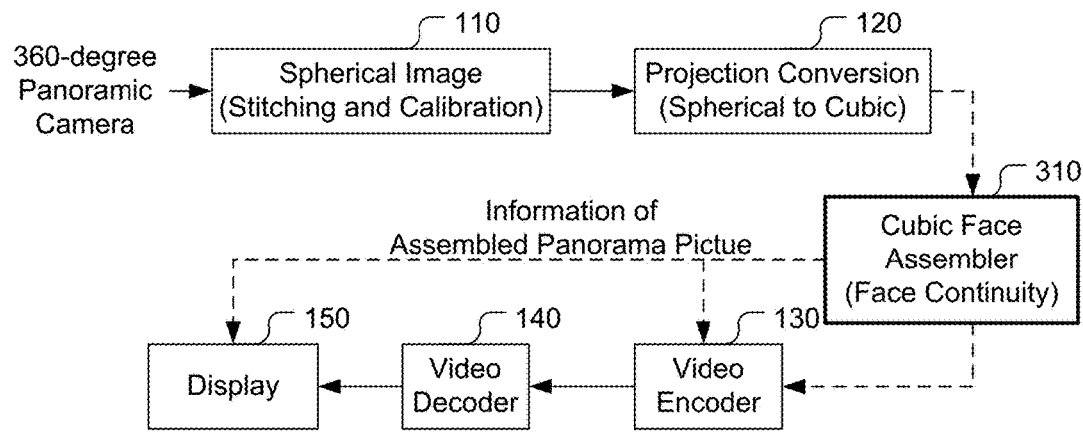
FIG. 3A illustrates an exemplary 360-degree panoramic system processing chain incorporate an embodiment of the present invention, where cubic face assembler is used to assemble the six cubic faces into an assembled image.
Figure 3B:
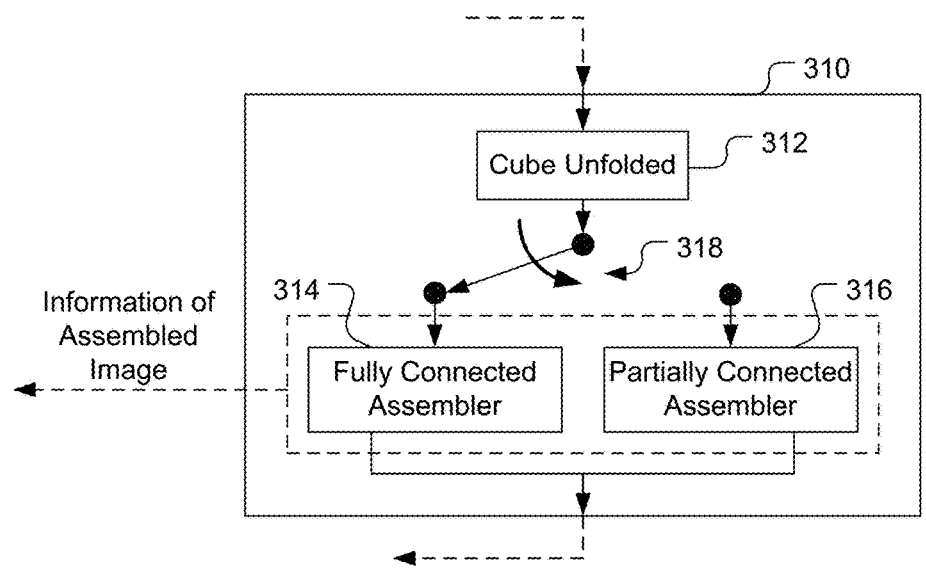
FIG. 3B illustrates an exemplary implementation of the cubic face assembler, where the unfolded faces can be partially connected or fully connected.

As mentioned before, the six cubic faces representing 360-degree panoramic picture are continuous at the boundary of two connecting faces. In order to preserve the continuity between faces, the present invention discloses various ways to assemble the six cubic faces. By preserving the continuity, it may help to improve processing efficiency, such as improved coding efficiency. A 360-degree panoramic system processing chain incorporate an embodiment of the present invention is shown in FIG. 3A, where cubic face assembler 310 is used to assemble the six cubic faces into an assembled image. The assembled image sequence is then subject to further processing such as video encoding and decoding. An exemplary implementation of the cubic face assembler 310 is shown in FIG. 3B, where the six faces are unfolded in step 312. After the faces are unfolded, they can be assembled using either fully connected assembler 314 or partially connected assembler 316. A switch 318 can be used to select between the two assemblers. The six faces may already be stored as individual images. In this case, the step 312 can be omitted. However, the relationship among the six faces with respect to a cube as shown in FIG. 2A should be stored or known to the decoder so that the six faces can be used correctly. Furthermore, the assembler may have only one type of assembler (either fully connected assembler 314 or partially connected assembler 316). In this case, the switch 318 is not needed.

Figure 4:
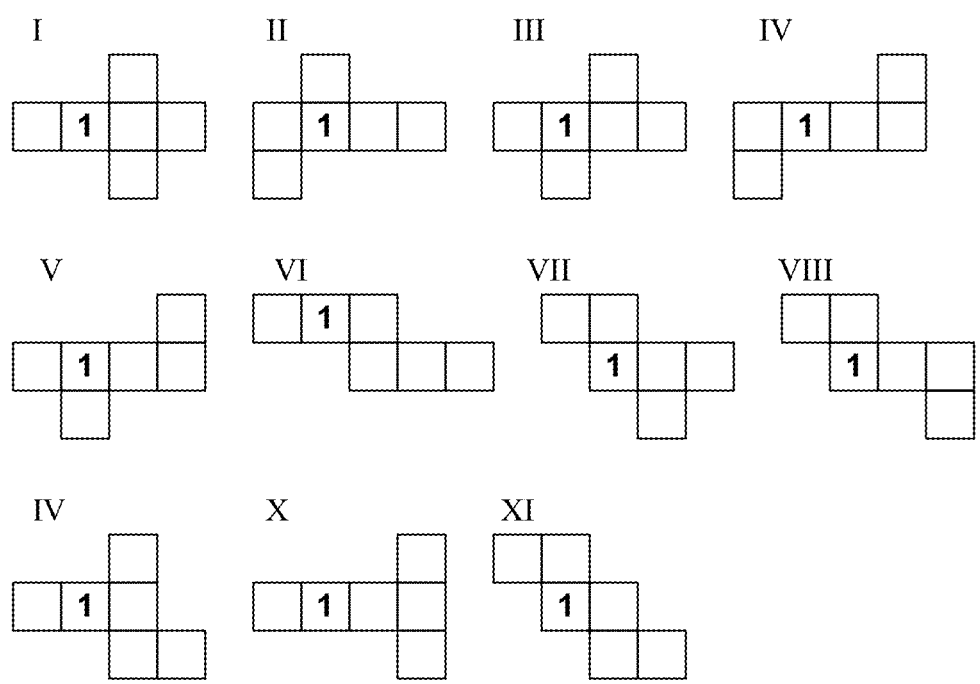
FIG. 4 illustrates 11 examples of cube image unfolding, where each unfolding type is referred as a cubic net.
Figure 5A:
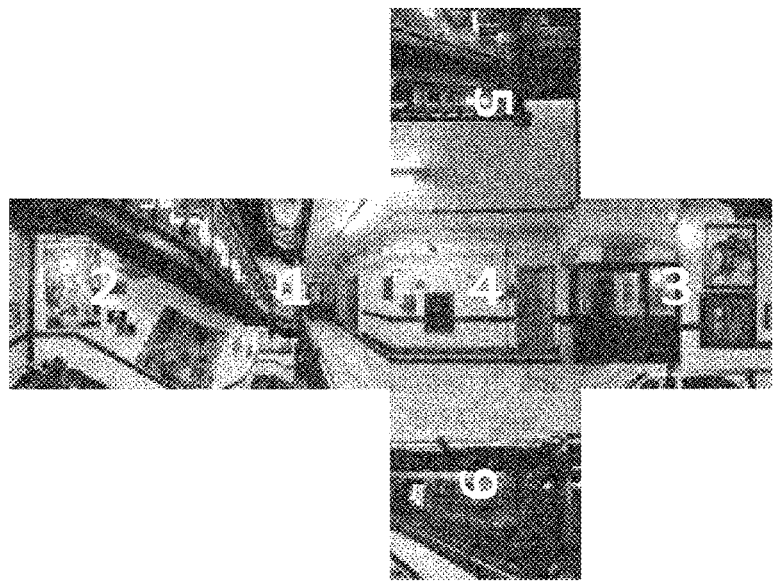
FIGS. 5A-K illustrate the 11 exemplary unfolded images corresponding to the six cubic faces shown in FIG. 2A.
Figure 5B:
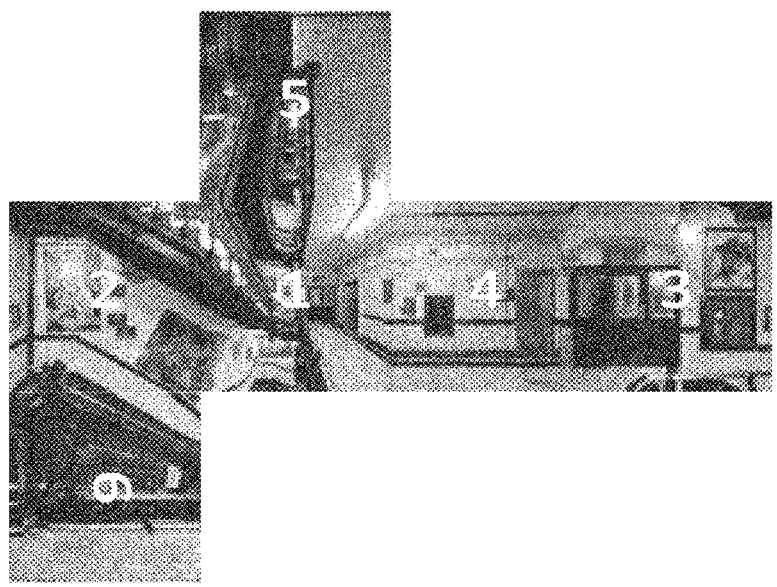
Figure 5C:
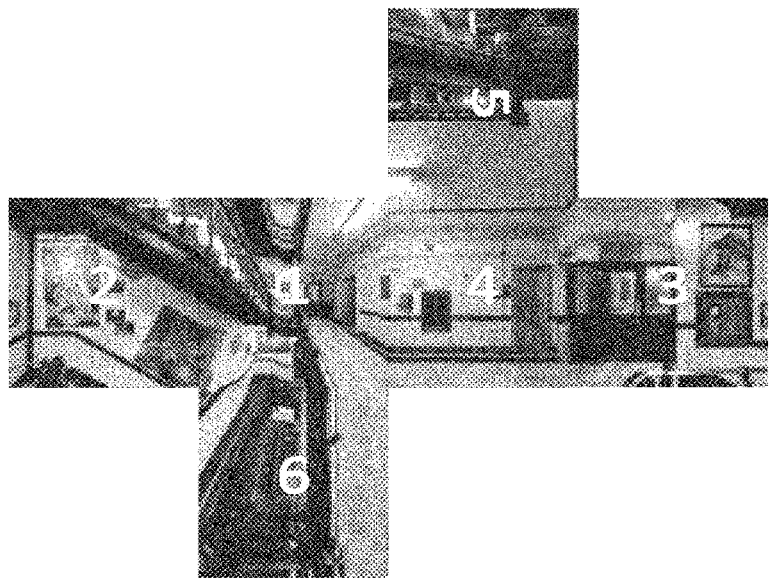
Figure 5D:
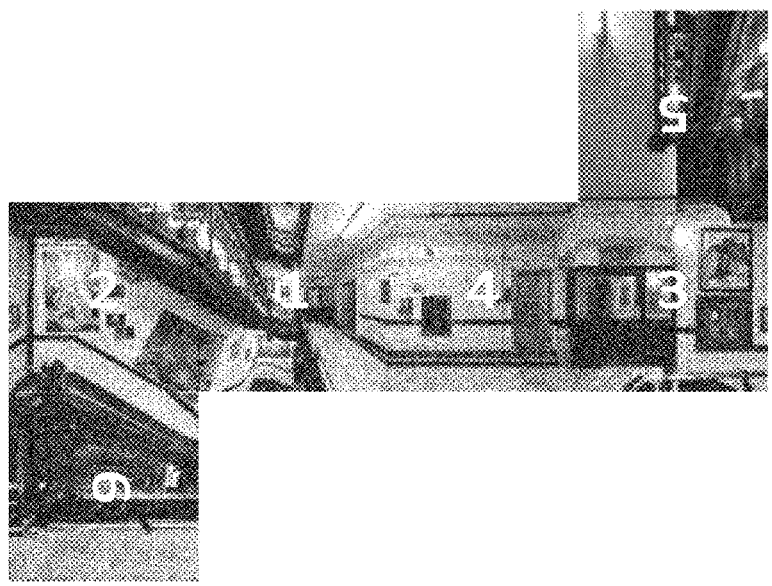
Figure 5E:
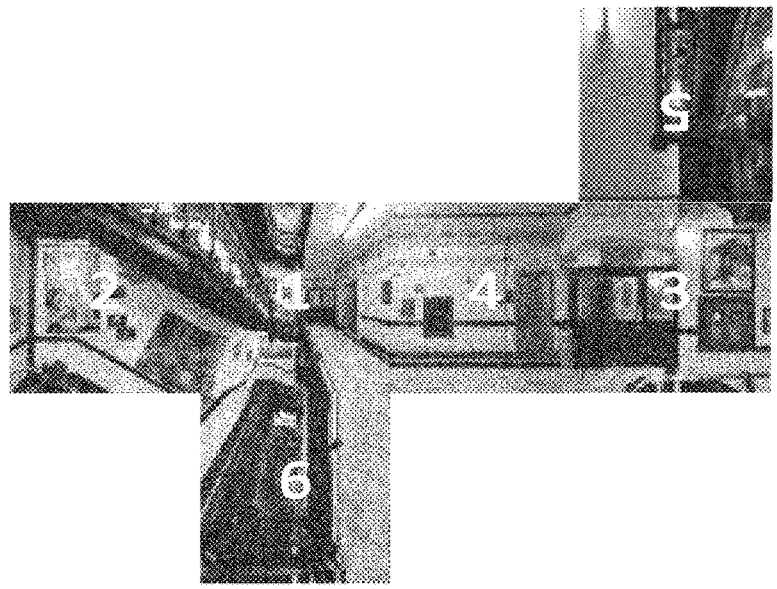
Figure 5F:
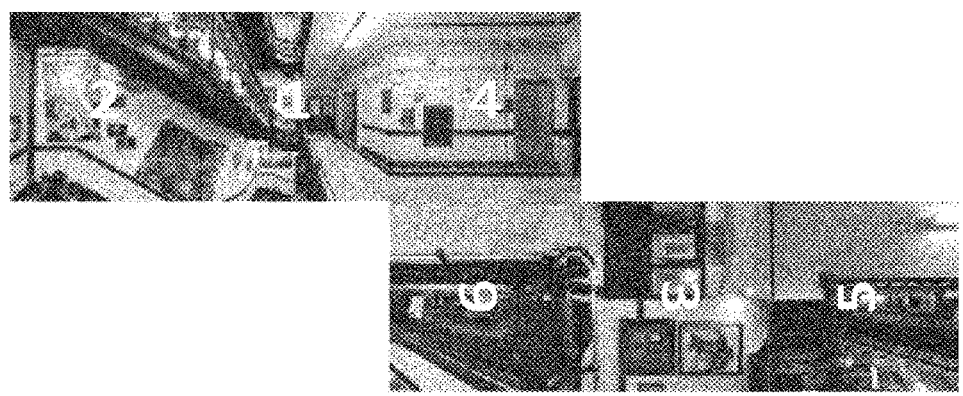
Figure 5G:
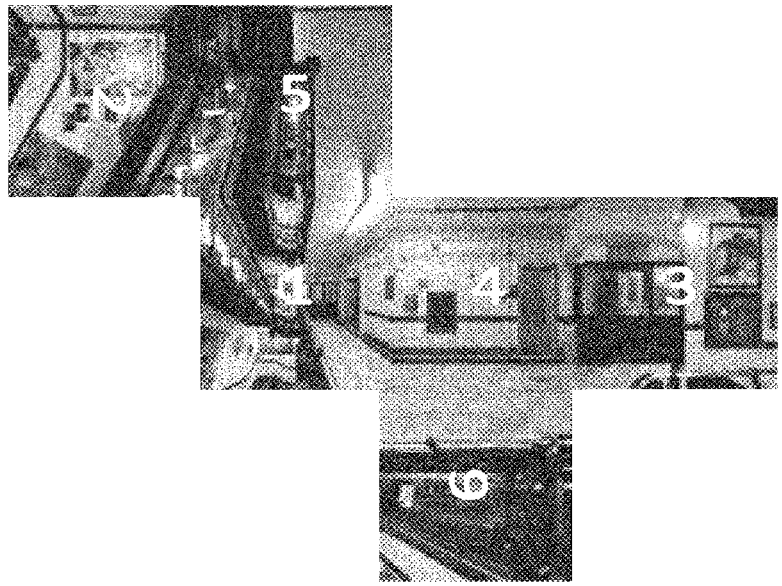
Figure 5H:
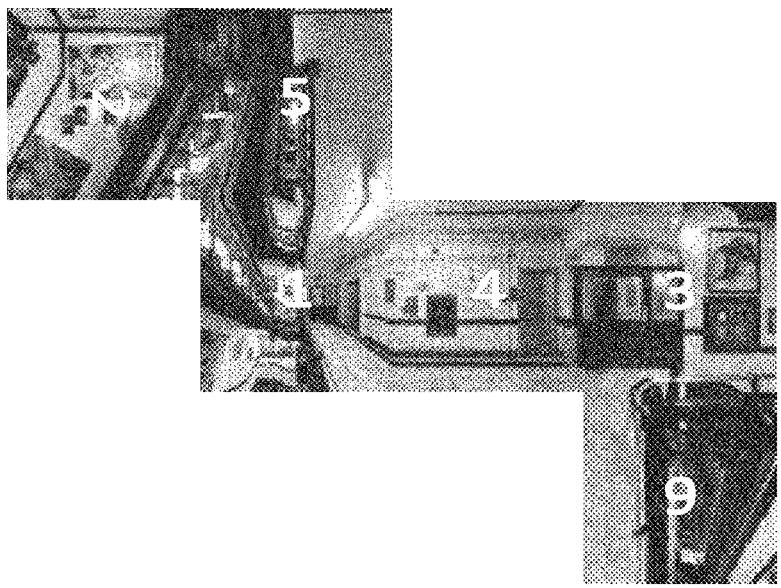
Figure 5I:
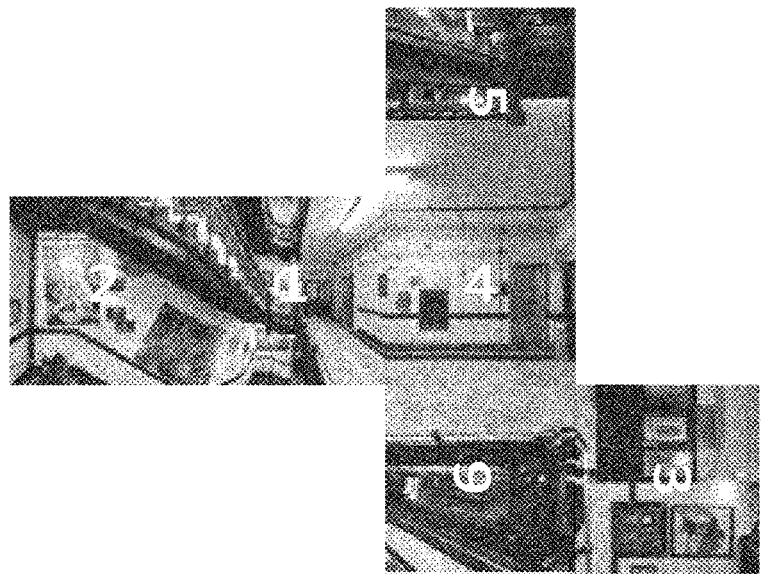
Figure 5J:
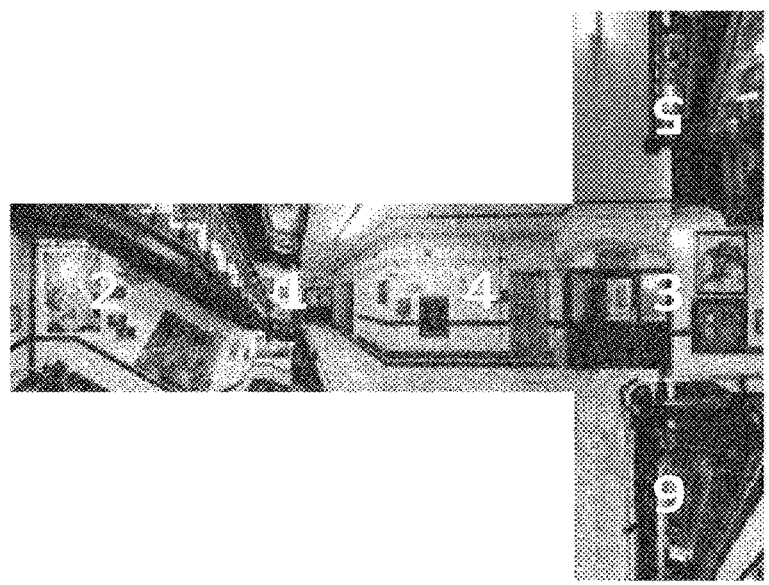
Figure 5K:
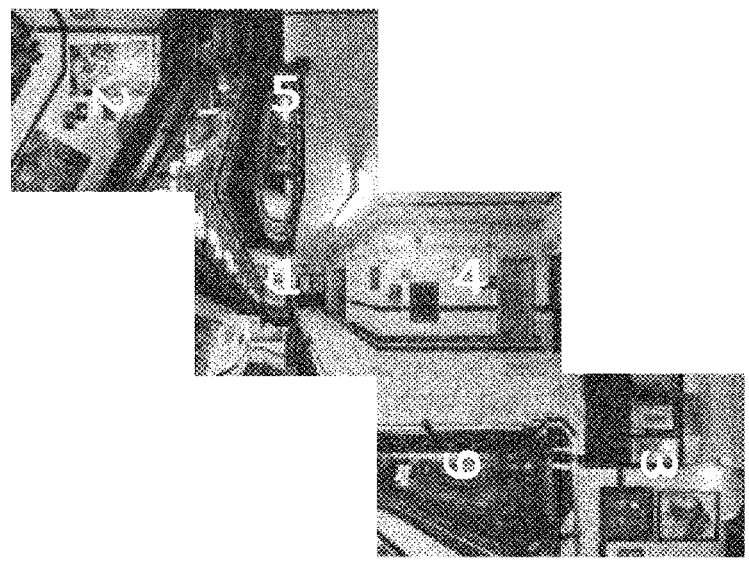

FIG. 4 illustrates 11 distinct examples of cube image unfolding. Each unfolding type is referred as a cubic net in this disclosure. These unfolded examples correspond to cutting a cubic box open along the edges while keeping all six faces still connected. Face 1 is labelled in each cubic net of FIG. 4. Therefore, the rest of the image ordering can be determined. As shown in FIG. 4, these unfolded six faces always have 5 connected face boundaries in each of the unfolded images. Furthermore, all these connected boundaries are continuous boundaries since each connected boundary in FIG. 4 corresponds to an edge of two connected faces of the cube. As mentioned before, the contents of the faces are continuous from one face to the other face across the edge.

For the six cubic faces of FIG. 2A, the 11 corresponding unfolded images are shown in FIG. 5A through FIG. 5K. As shown in FIG. 5A through FIG. 5K, any two connected faces are always continuous across the boundaries. The face number is labelled for each face to show the orientation of the faces.

Figure 6:
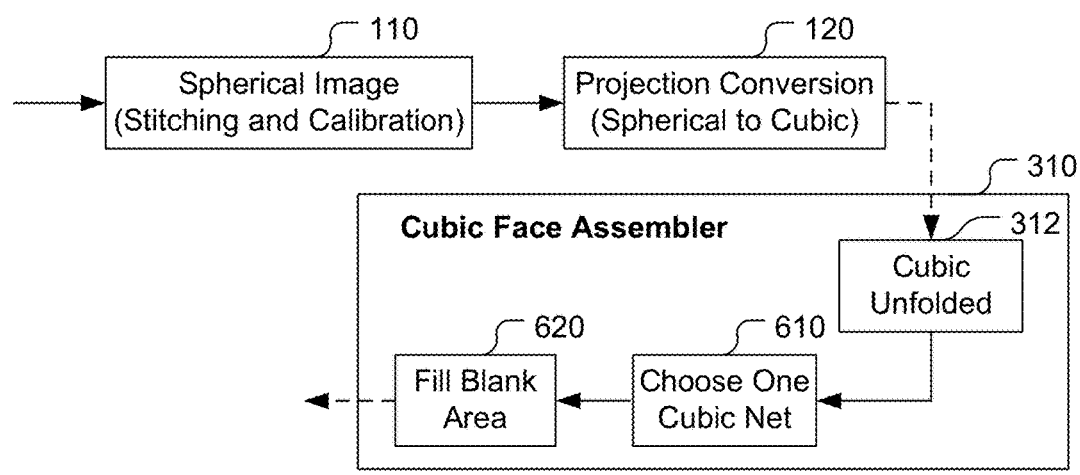
FIG. 6 illustrates an example of deriving a rectangular picture for the 360-degree spherical picture by patching the odd-shaped cubic-net images with known pixel data.
Figure 7A:
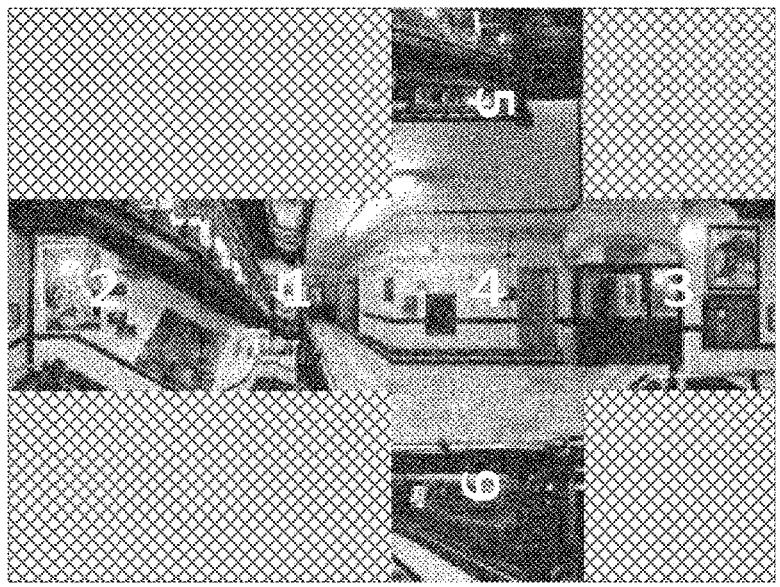
FIGS. 7A-K illustrate the 11 exemplary patched pictures according to the process in FIG. 6.
Figure 7A:
Figure 7B:
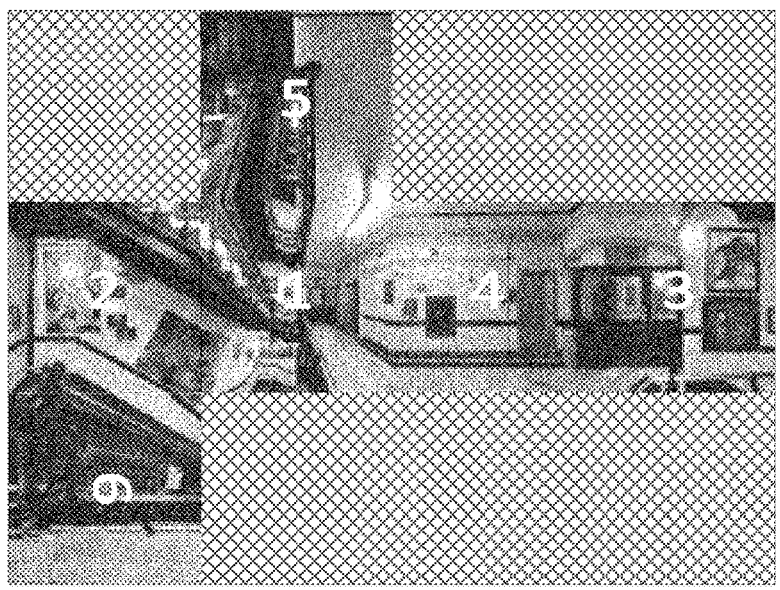
Figure 7B:
Figure 7C:
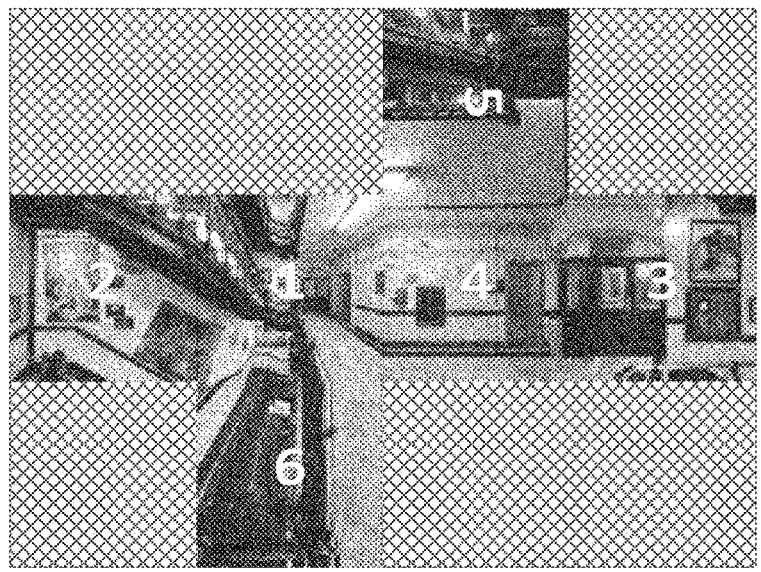
Figure 7C:
Figure 7D:
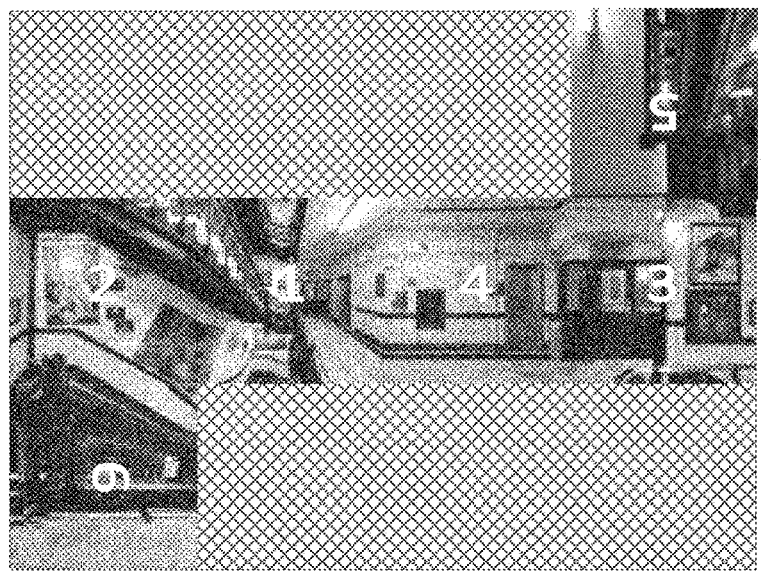
Figure 7D:
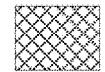
Figure 7E:
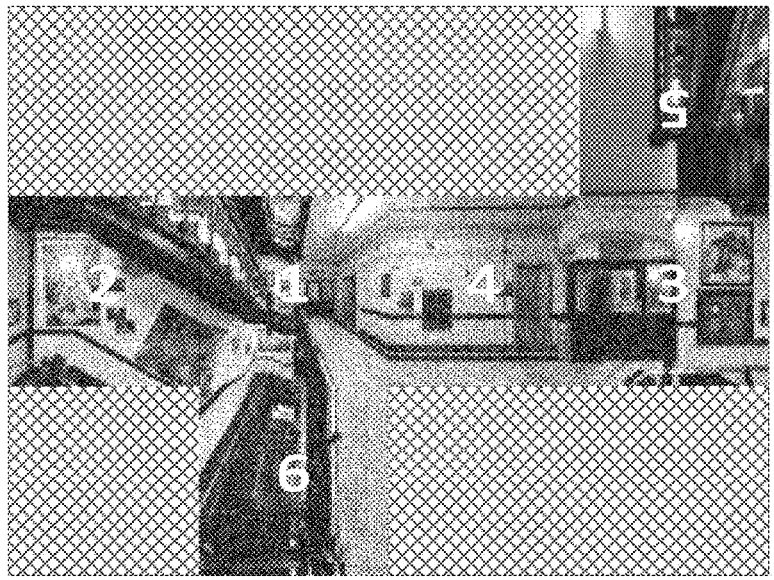
Figure 7E:
Figure 7F:
Figure 7F:
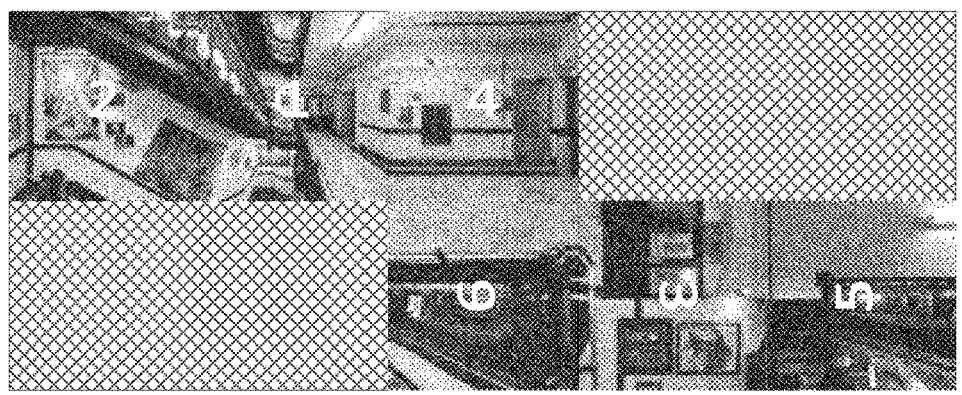
Figure 7G:
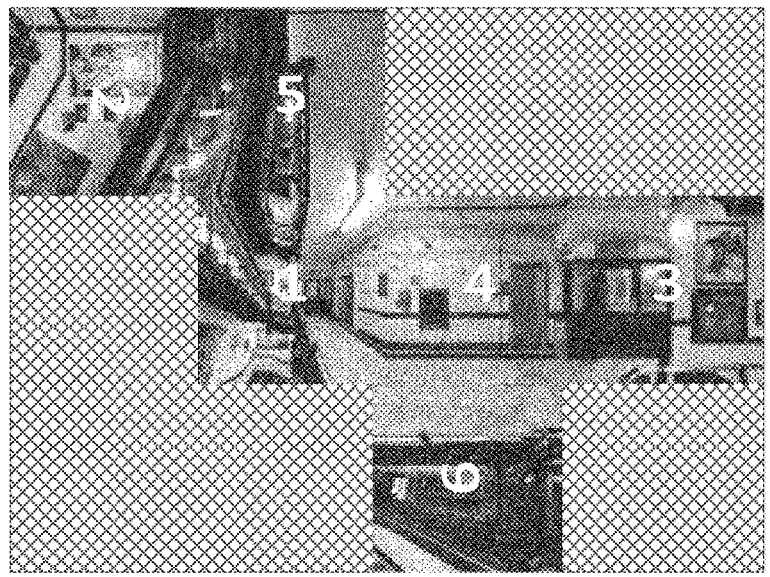
Figure 7G:
Figure 7H:
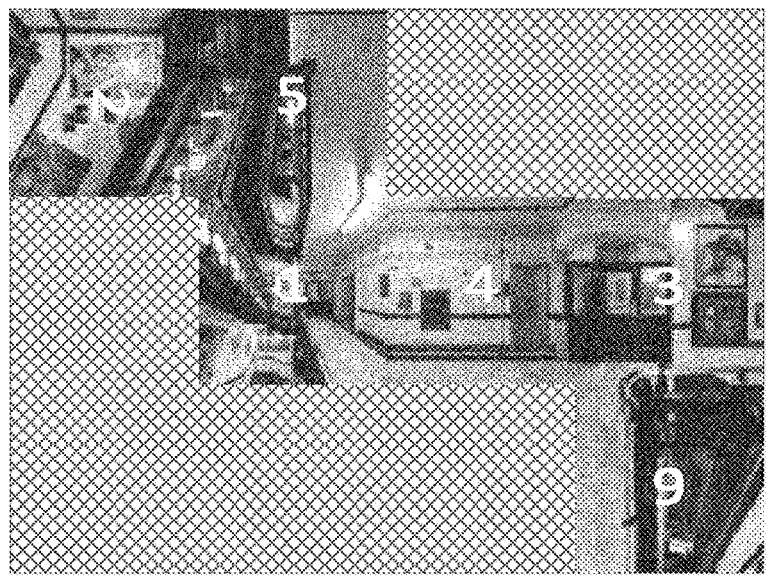
Figure 7H:
Figure 7I:
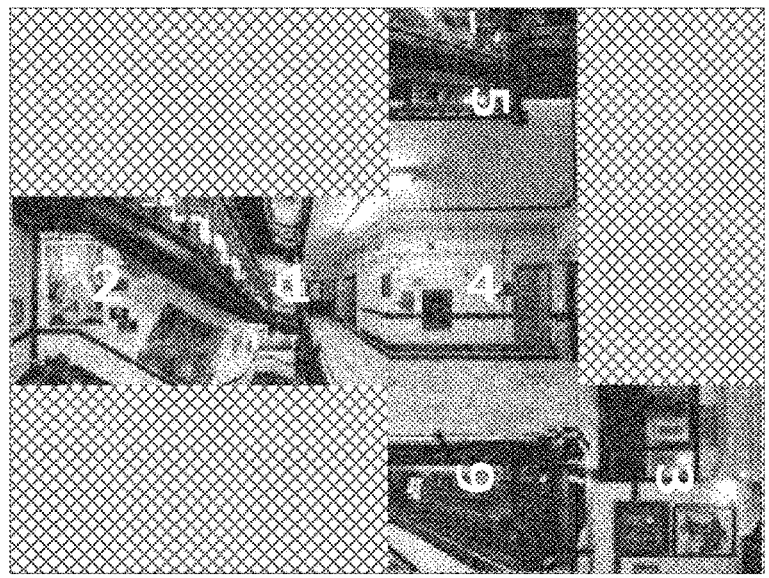
Figure 7I:
Figure 7J:
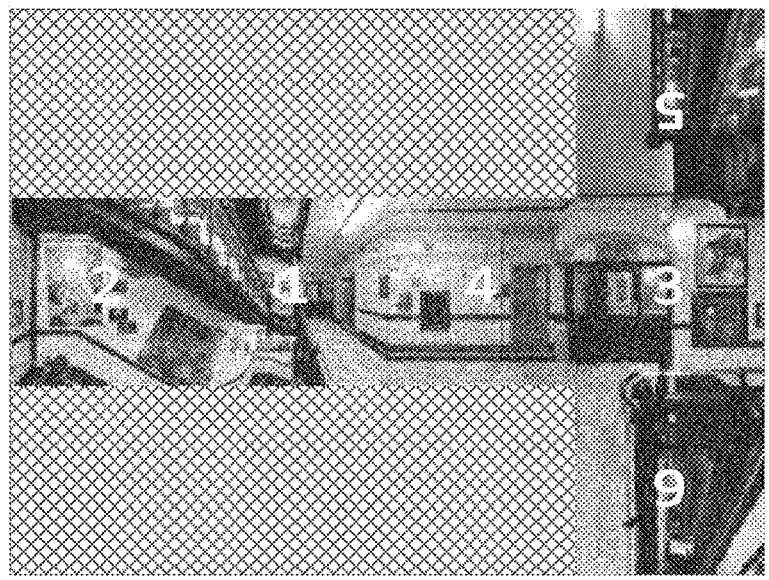
Figure 7J:
Figure 7K:
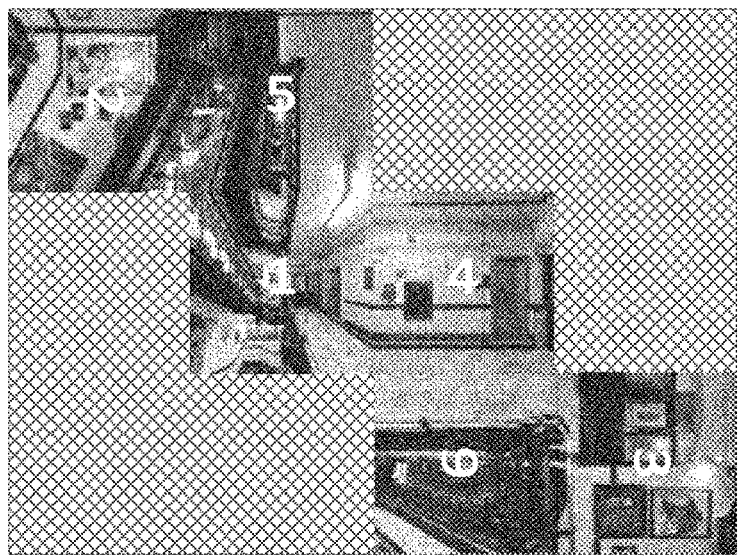

The six faces in each cubic net contain all the information required to present a 360-degree panoramic picture. However, the six faces associated with a cubic net form an odd-shape picture, which is not compatible with the conventional picture format of a rectangular shape. In order to generate a rectangular picture for the 360-degree spherical picture, an embodiment of the present invention patches the images corresponding to a cubic net with known pixel data (e.g. zero-valued pixel) to form a rectangular picture. FIG. 6 illustrates an example of deriving a rectangular picture for the 360-degree spherical picture by patching the odd-shaped cubic-net images with known pixel data. As shown in FIG. 6, a cubic net is selected in step 610 after cubic unfolding process 312. The blank areas in the cubic-net image are then filled with patch data. The pixel value for the patch data is known. For example, in a case of 8-bit pixel values are used (i.e., the number of bits used to indicate each color component of a pixel, BitDepth, is 8), the patch value could be zero (black), 128 ($2^{BitDepth-1}=2^{8-1}$, gray) or 255 ($2^{BitDepth}-1=2^{8}-1$, white). In this approach, the cubic-net images are patched to generate a single picture for each set of six cubic faces. Hence, the generated picture is fully connected.

For the 11 unfolded cubic-net images, the patched pictures according to the cubic face image assembly process in FIG. 6 are shown in FIG. 7A through FIG. 7K, where the areas filled with cross-hatched lines indicate patched areas. As shown in FIG. 7A through FIG. 7K, any two connected faces are continuous across the boundaries.

Figure 8:
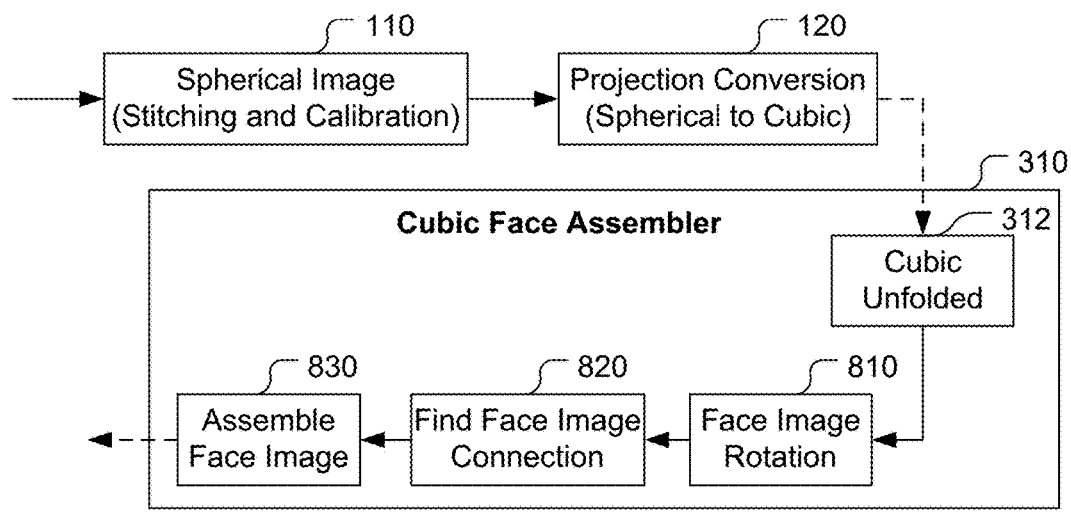
FIG. 8 illustrates another example of deriving a rectangular assembled image for the 360-degree spherical picture by forming multiple partially connected rectangular images.
Figure 9A:
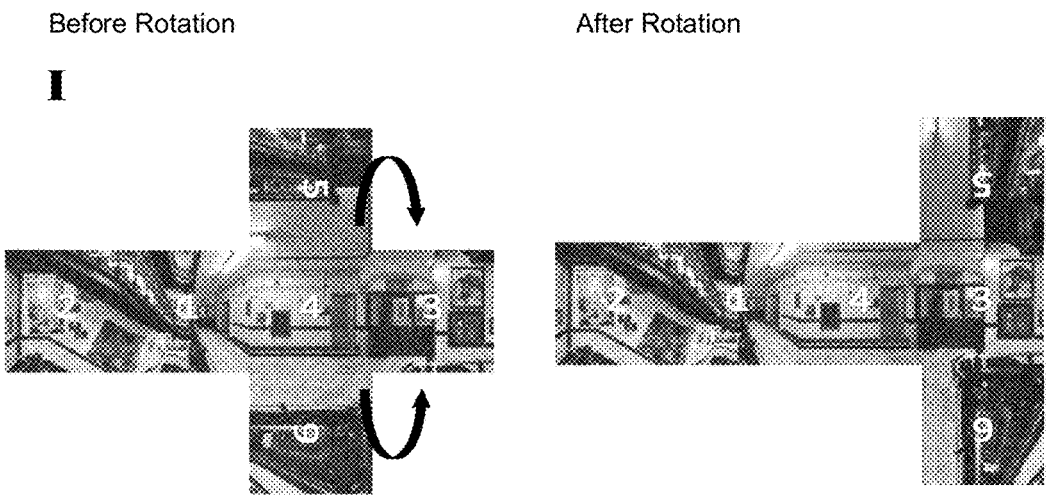
FIGS. 9A-K illustrate the 11 exemplary multiple partially connected rectangular images according to the process in FIG. 8.
Figure 9B:
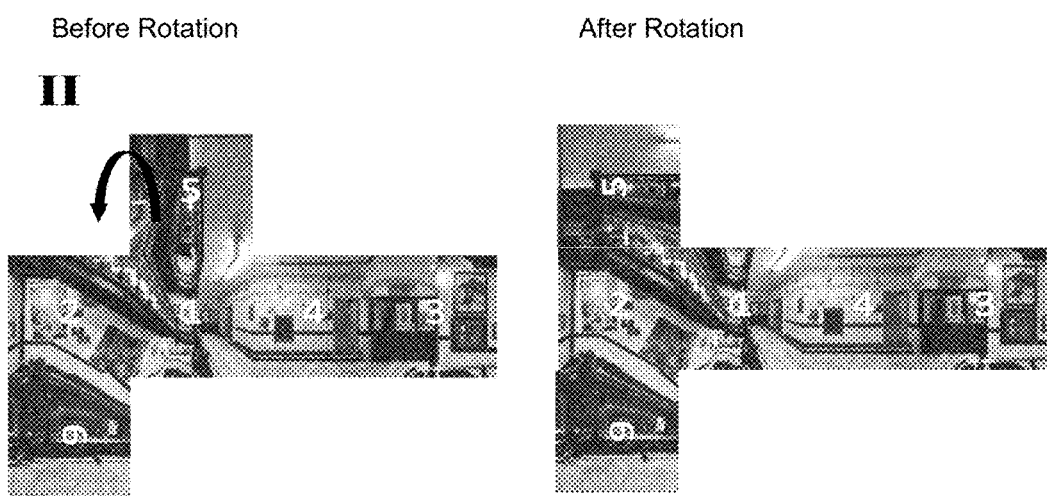
Figure 9C:
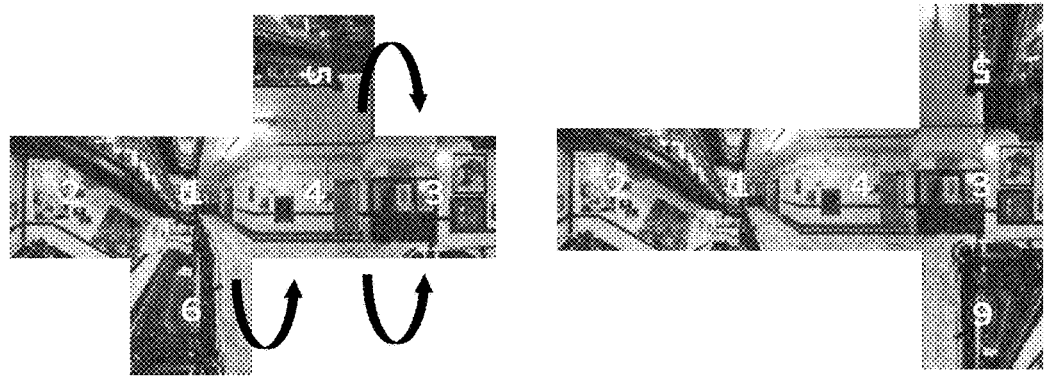
Figure 9D:
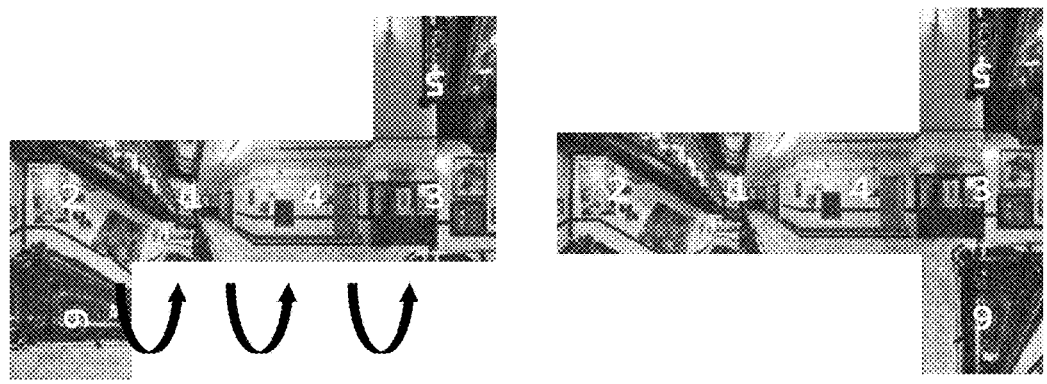
Figure 9E:
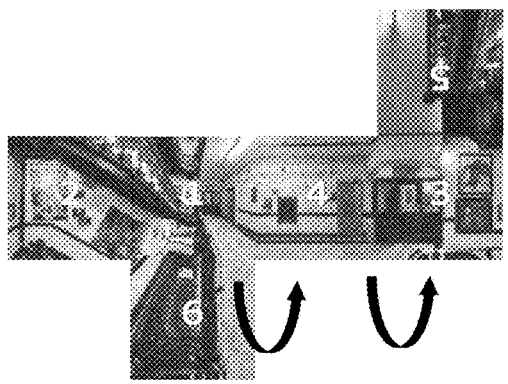
Figure 9E:
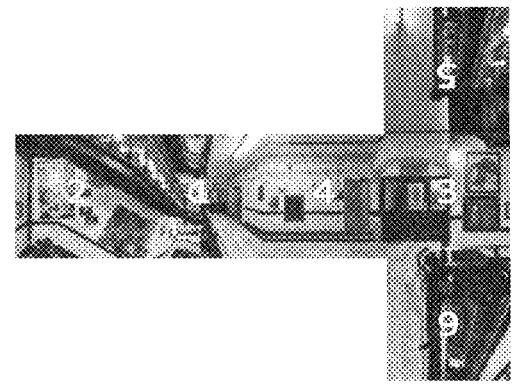
Figure 9F:
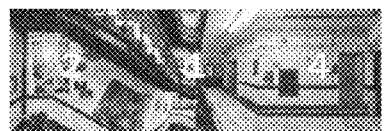
Figure 9F:
Figure 9F:
Figure 9G:
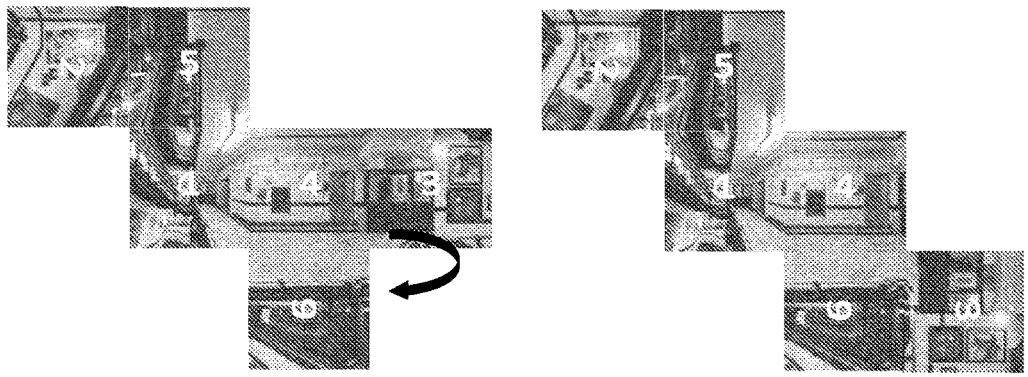
Figure 9H:
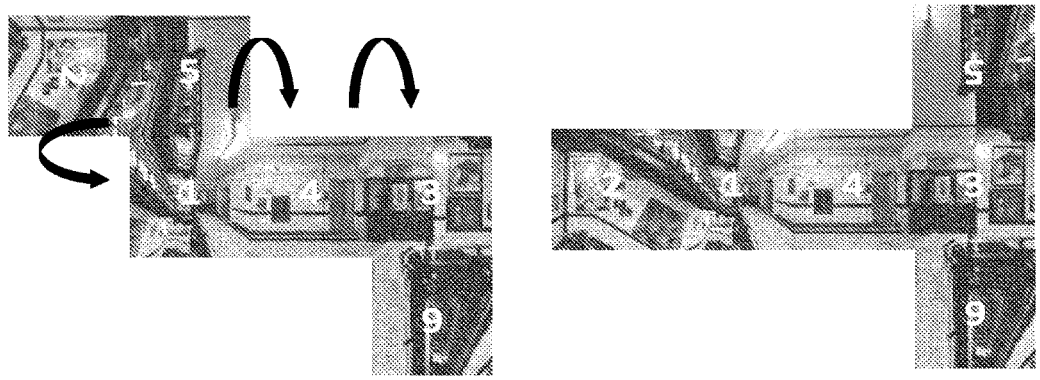
Figure 9I:
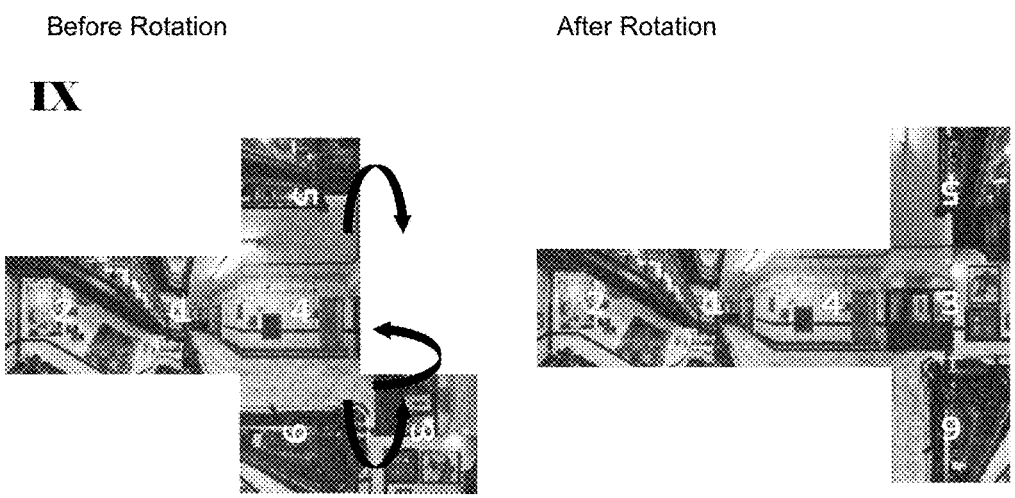
Figure 9J:
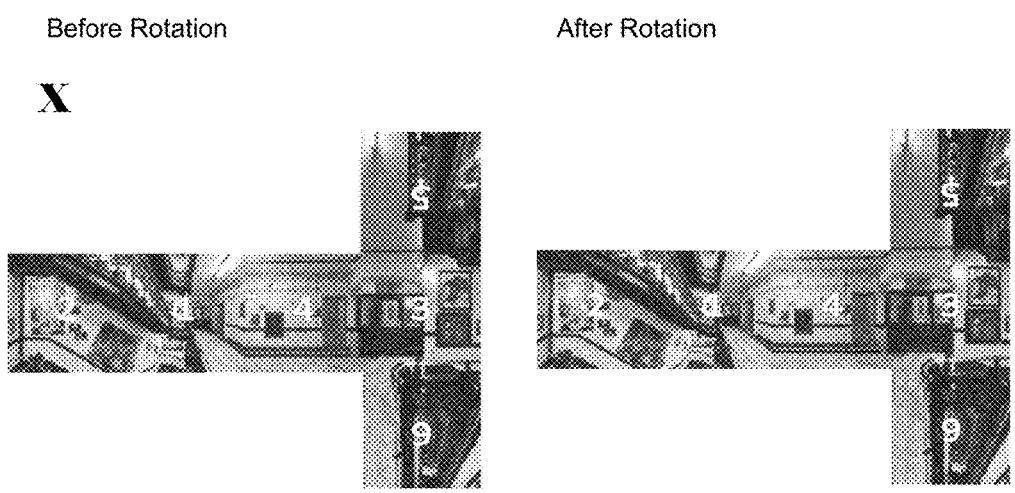
Figure 9K:
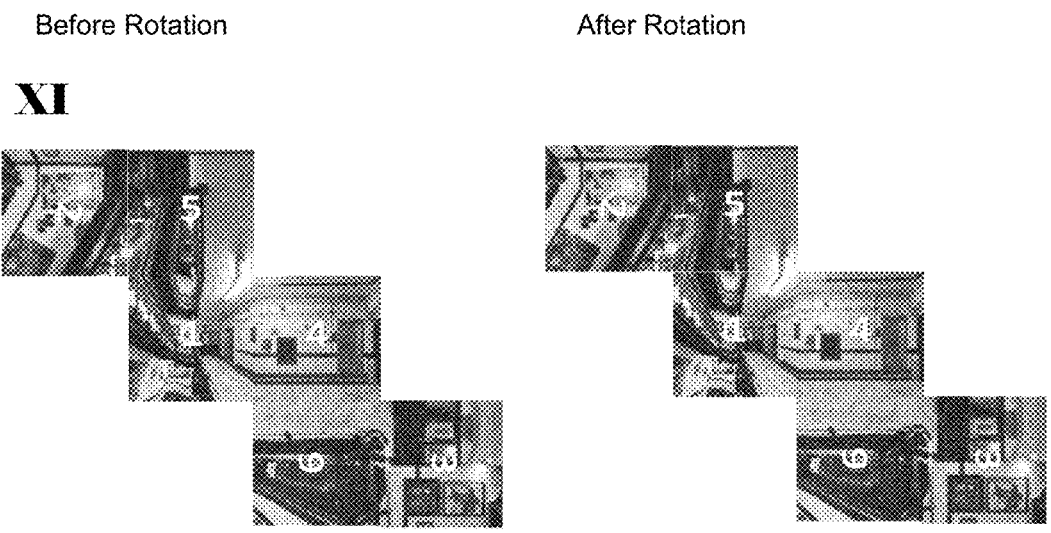

FIG. 8 illustrates another example of deriving a rectangular assembled image for the 360-degree spherical picture by forming multiple partially connected rectangular images. As shown in FIG. 8, the unfolded face images are rotated to desired locations with correct orientation in step 810. The faces may be rotated to form a shape that can be segmented into a small number of connected rectangular images with the same size while maintaining the maximum connectivity. The connections among the rotated faces are identified in step 820 and the rotated-connected faces are then assembled into a rectangular assembled image accordingly in step 830.

For the 11 unfolded cubic-net images, the face rotation according to step 810 of the process in FIG. 8 are shown in FIG. 9A through FIG. 9K, where the desired rotations are indicated by arrows as shown on the left-hand side of each figure. The connected faces after the desired rotations are shown on the right-hand side of each figure. In FIG. 9A through FIG. 9K, there are three types (A, B and C) of connected images after rotation as summarized in the first column of FIG. 10. According to the process shown in FIG. 8, the connections among the rotated faces are identified in step 820. The connected faces of the type A consist of two connected rectangular images (i.e., size 3 for each as shown in segmentation-a in second column of FIG. 10), where the arrows indicate the three faces associated with size-3 connected rectangular image. Within each size-3 connected rectangular image, the image contents are continuous from one face to another face across the boundary of two connected faces. The connected faces of the type B also consist of two connected rectangular images (i.e., size 3 for each designated as segmentation-b1 in FIG. 10). For the two size-3 connected rectangular images, one is oriented horizontally and the other is oriented vertically. Again, within each size-3 connected rectangular image, the image contents are continuous from one face to another face across the face boundary. Alternatively, the type B connected images can be treated as one size-4 connected rectangular image and two single faces designated as segmentation-b2 in last column of FIG. 10. For the size-4 connected rectangular image, the contents of the four faces are continuous across the boundaries of the four faces. The connected faces of the type C consist of three connected rectangular images (i.e., size 2 for each designated as segmentation-c in FIG. 10). Contents of each size-2 connected images are continuous across the face boundary.

Figure 10:
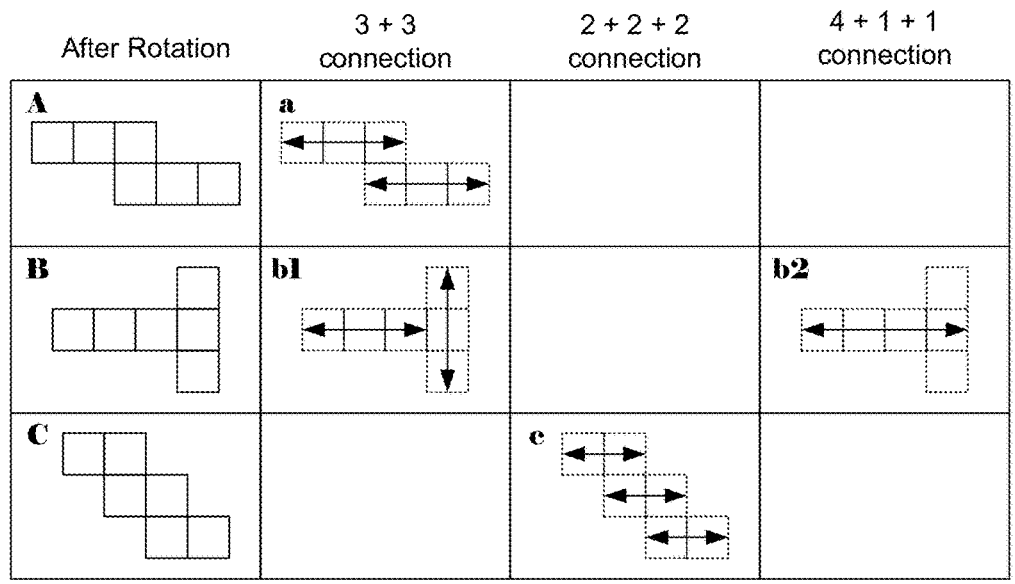
FIG. 10 illustrates examples of various types of partially connected images according to embodiments of the present invention.

As shown in FIG. 10, the connected images as identified by different segmentation types (i.e., a, b1, b2 and c) have different degree of connectivity. For segmentation types a and b1, each set of six faces has 4 continuous boundaries. For segmentation types b2 and c, each set of six face images has 3 continuous boundaries.

Figure 11A:
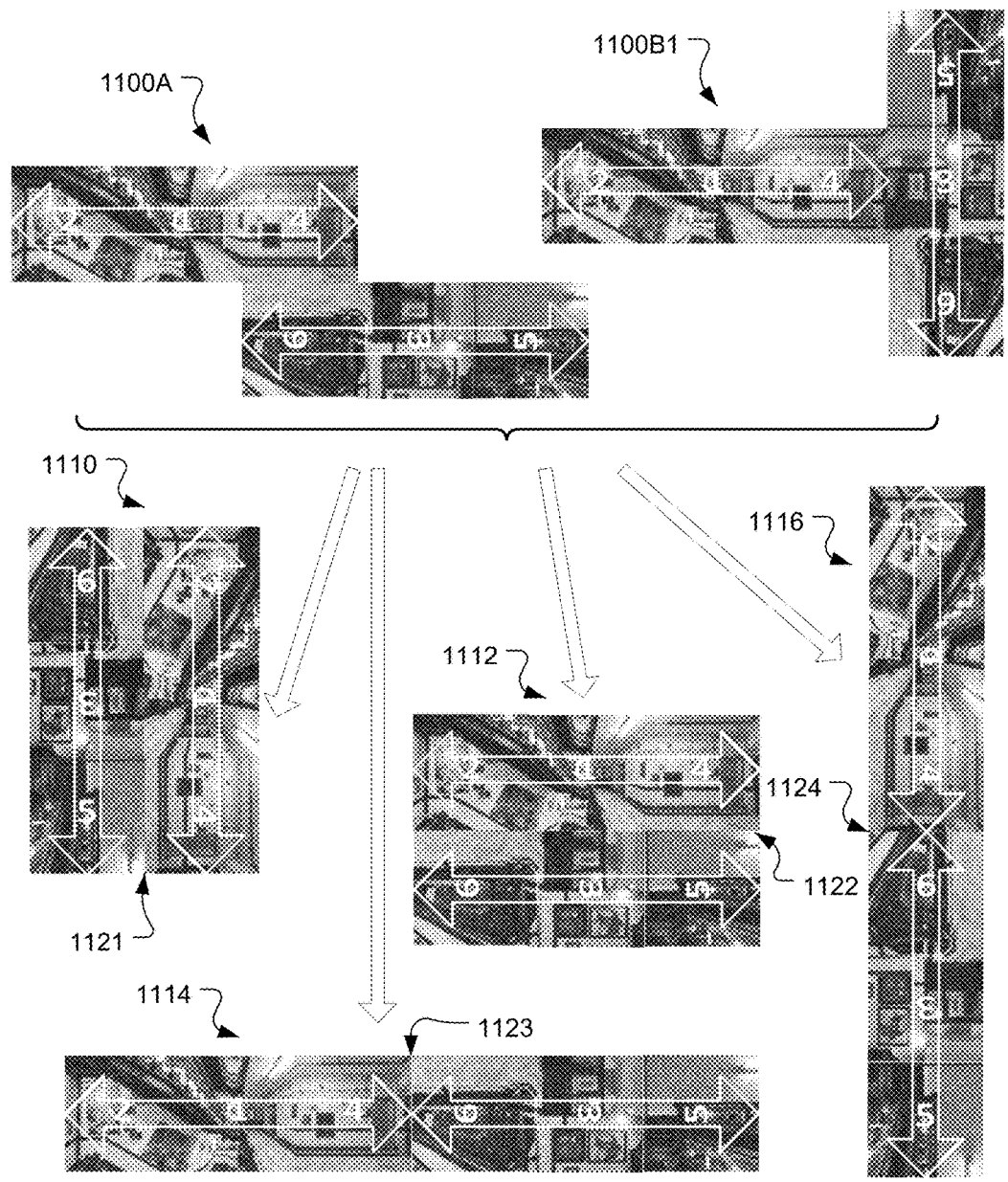
FIG. 11A illustrates examples of assembly for segmentation-a and segmentation-b1 connected images with face connections identified.

After the face connections are identified, the faces can be assembled into one rectangular image corresponding to the six faces associated with each 360-degree spherical panoramic picture. FIG. 11A illustrates examples of face image assembly for segmentation-a (1100A) and segmentation-b1 (1100B1) connected images with face connections identified. Since both segmentation-a and segmentation-b1 consist of two size-3 connected images, both segmentations are treated the same way during the face image assembly process. For segmentation-a, the two size-3 connected face images are connected between face 4 and face 6. Furthermore, the two size-3 connected face images have the same orientation (i.e., both horizontal). For segmentation-b1, the two size-3 connected face images are connected between face 4 and face 3. Furthermore, the two size-3 connected face images have the different orientation (i.e., one horizontal and one vertical). While the two size-3 connected face images are connected differently in segmentation-a and segmentation-b1, the two size-3 connected face images are the same for segmentation-a and segmentation-b1. One size-3 connected face image consists of faces 2, 1 and 4 and the other consists of faces 6, 3 and 5. These face images in segmentation-a and segmentation-b1 are connected in a same way within the size-3 connected face image.

Four different cubic face image assemblies are possible (1110 to 1116) as shown in FIG. 11A. For image assembly 1110, the two size-3 images are assembled into one 3×2 image by butting the two size-3 face images together on the long image side (i.e., the side with 3 face images). For image assembly 1112, the two size-3 images are assembled into one 2×3 image by butting the two size-3 face images together on the long image side (i.e., the side with 3 face images). Alternatively, the two size-3 images can be assembled into one 1×6 image (1114) by butting the two size-3 face images together on the short image side (i.e., the side with 1 face image). The two size-3 images can be assembled into one 6×1 image (1116) by butting the two size-3 face images together on the short image side (i.e., the side with 1 face image). In these four assembled images, the boundary (1121, 1122, 1123 or 1124) between two size-3 images is not continuous. For face image assemblies 1110 and 1112, there are three discontinuous face boundaries along the boundaries 1121 and 1122 respectively. For face image assemblies 1114 and 1116, there are only one discontinuous face boundary along the boundaries 1123 and 1124 respectively. For all four face image assemblies, there are four continuous face image boundaries corresponding to two continuous face boundaries within each of the two size-3 connected images. Therefore, face image assemblies 1114 and 1116 have the smallest number of discontinuous face boundaries.

Figure 11B:
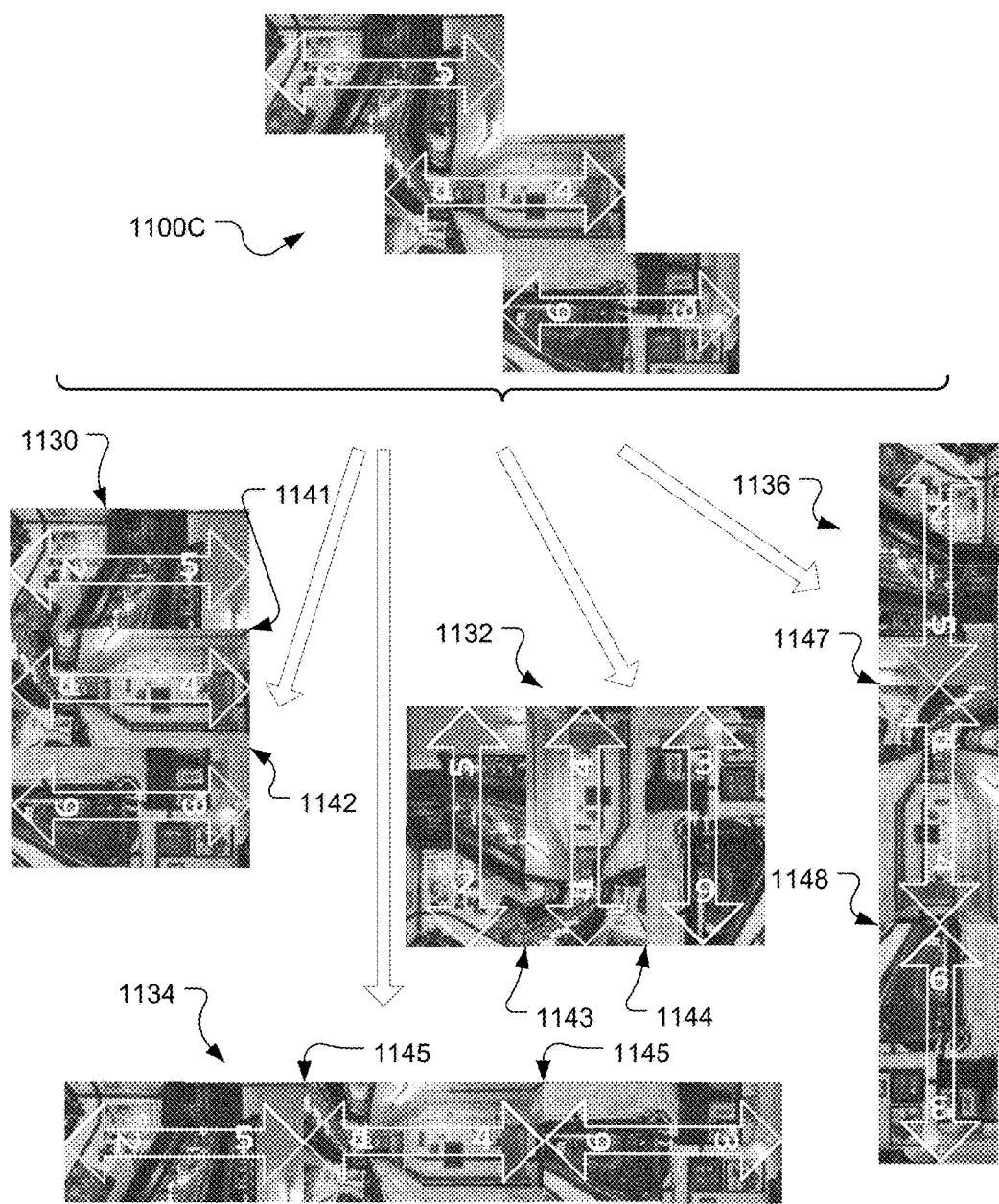
FIG. 11B illustrates examples of assembly for segmentation-c connected images with face connections identified.

Also, four different cubic face images assemblies are possible (1130 to 11136) for segmentation-c images (1100C) as shown in FIG. 11B. For image assembly 1130, the three size-2 images are assembled into one 3×2 image by butting the three size-2 face images together on the long image side (i.e., the side with 2 face images). For image assembly 1132, the three size-2 images are assembled into one 2×3 image by butting the three size-2 face images together on the long image side (i.e., the side with 2 face images). Also, the three size-2 images can be assembled into one 1×6 image (1134) or one 6×1 image (1136) by butting the three size-2 face images together on the short image side (i.e., the side with 1 face image). In these assembled images, the boundary (1141 to 1148) between three size-2 images is not continuous. For segmentation-c images, there are three continuous face boundaries corresponding to one within each of the three size-2 images. For face image assemblies 1130 and 1132, there are four discontinuous face boundaries corresponding to two for each of the boundaries between two size-2 images. On the other hand, for face image assemblies 1134 and 1136, there are two discontinuous face boundaries corresponding to one for each of the boundaries between two size-2 images.

Figure 11C:
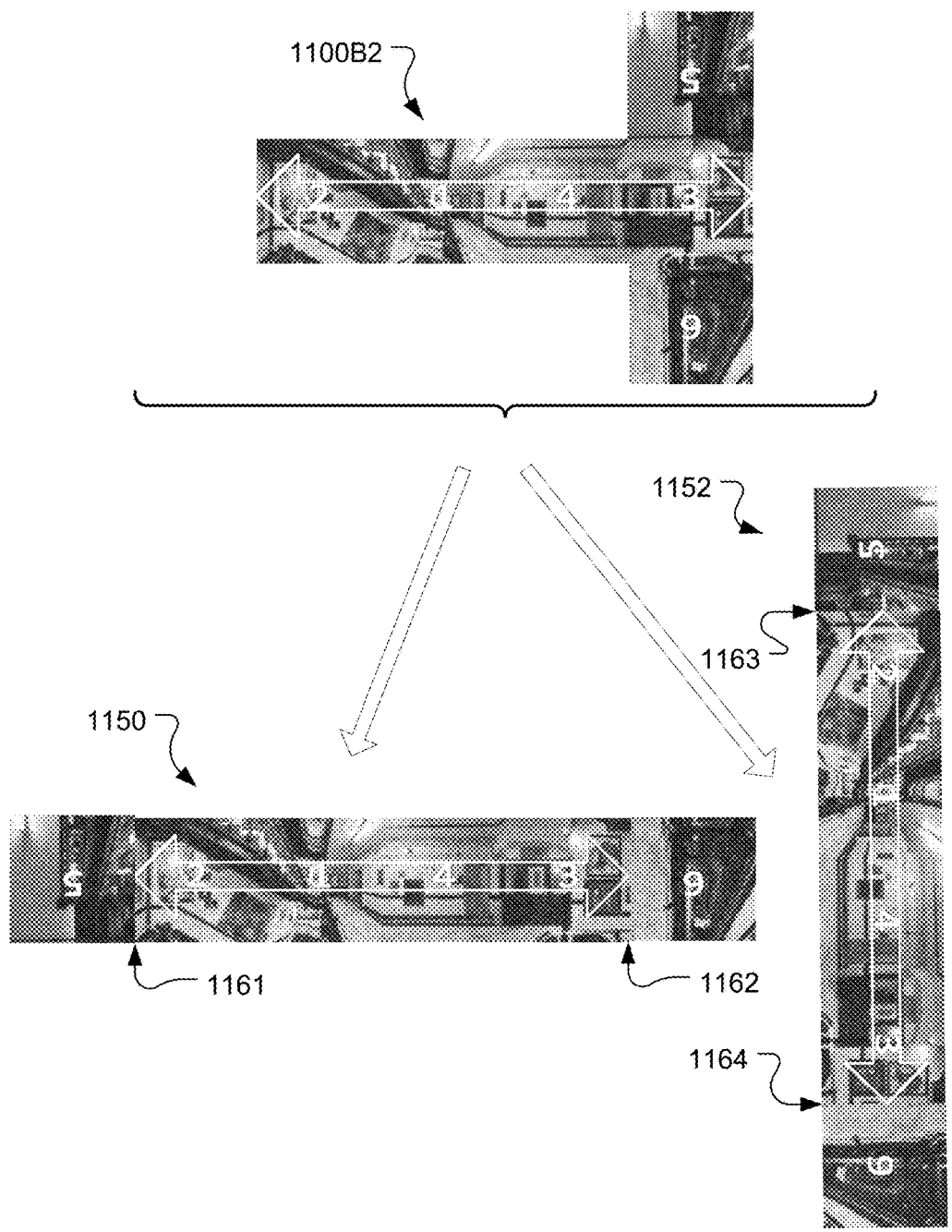
FIG. 11C illustrates examples of assembly for segmentation-b2 connected images with face connections identified.

In FIG. 11C, face image assemblies (1150 and 1152) for segmentation b2 images (1100B2) are shown, where the image is segmented into one size-4 connected face image and two single faces. For image assembly 1150, the size-4 connected face image and two single faces are assembled into one 1×6 image. For image assembly 1152, the size-4 connected face image and two single faces are assembled into one 6×1 image. In these assembled images, the boundary (1161, 1162, 1163 or 1164) between the size-4 and each single image is not continuous. For assemblies 1150 and 1152, the final rectangular image has three continuous face boundaries and two discontinuous face boundaries.

As shown in FIG. 3A, one intended use of the assembled images is video compression. Since the image sequence corresponding to video captured using a 360-degree panoramic camera results in much more video data compared to the conventional video for 2D applications. Therefore, it is highly desirable to compress the 360-degree panoramic image sequence. There are various existing video coding standards, such as MPEG-2, MPEG-4/AVC, VC-9, HEVC, etc., for conventional video sources. The assembly process according to the present invention generates rectangular images, which can be easily fitted into the environment of conventional video coding.

As known in video coding, the coding process achieves compression by exploiting spatial and/or temporal redundancy in the video source. The various types of face image assemblies result in rectangular assembled images with different numbers of continuous s and different numbers of discontinuous faces. For rectangular assembled images with a higher number of continuous faces and/or lower numbers of discontinuous s presumably have higher spatial and/or temporal redundancy. Therefore, such rectangular assembled images are likely to achieve better compression efficiency. For example, The assembled 6×1 and 1×6 rectangular images (1116 and 1114) in FIG. 11A have the largest number of continuous face boundaries (i.e., 4) and the smallest number of discontinuous face boundary (i.e. 1), therefore such rectangular assembled images are expected to achieve the best compression performance. There are other assembled 6×1 and 1×6 rectangular images corresponding to other segmentations. For example, the assembled 6×1 and 1×6 rectangular images (1136 and 1134) in FIG. 11B have three continuous face boundaries and two discontinuous face boundaries. Also, the assembled 6×1 and 1×6 rectangular images (1150 and 1152) in FIG. 11C have three continuous face boundaries and two discontinuous face boundaries. The assembled 3×2 and 2×3 rectangular images (1110 and 1112) in FIG. 11A have four continuous face boundaries and three discontinuous face boundaries. The assembled 3×2 and 2×3 rectangular images (1130 and 1132) in FIG. 11B have three continuous face boundaries and four discontinuous face boundaries.

Based on the above observation, the assembled 6×1 and 1×6 rectangular images (1116 and 1114) in FIG. 11A are likely to have the best coding performance among various assembled image types shown in FIGS. 11A-C. Performance comparison has been conducted for the various assembled image types of FIGS. 11A-C. The anchor system uses 2×3 images, where none of neighboring faces has continuous contents across the boundary of any two connected faces. Conventional standard HEVC is used as the video coder for the comparison. The assembled 6×1 and 1×6 rectangular images (1116 and 1114) in FIG. 11A achieve the best performance with coding gains between 3.0-5.4% for three different test sequences. In particular, the 6×1 assembled images outperform the 1×6 assembled images slightly. The assembled 3×2 and 2×3 rectangular images (1110 and 1112) in FIG. 11A achieve the next best performance with coding gains between 1.7-3.6% for three different test sequences.

While the assembled 6×1 and 1×6 rectangular images (1116 and 1114) in FIG. 11A achieve the best performance, the assembled 6×1 rectangular images have an advantage over the assembled 1×6 rectangular images for implementation. For video coding utilizing Inter/Intra prediction, line buffers are often used to store necessary coding information of the previous coding-unit row. A wider picture will require larger line buffers. The 6×1 assembled images is much narrow than the 1×6 assembled images. Accordingly, the assembled 6×1 rectangular images (1116) in FIG. 11A is a preferred embodiment of the present invention.

Figure 12:
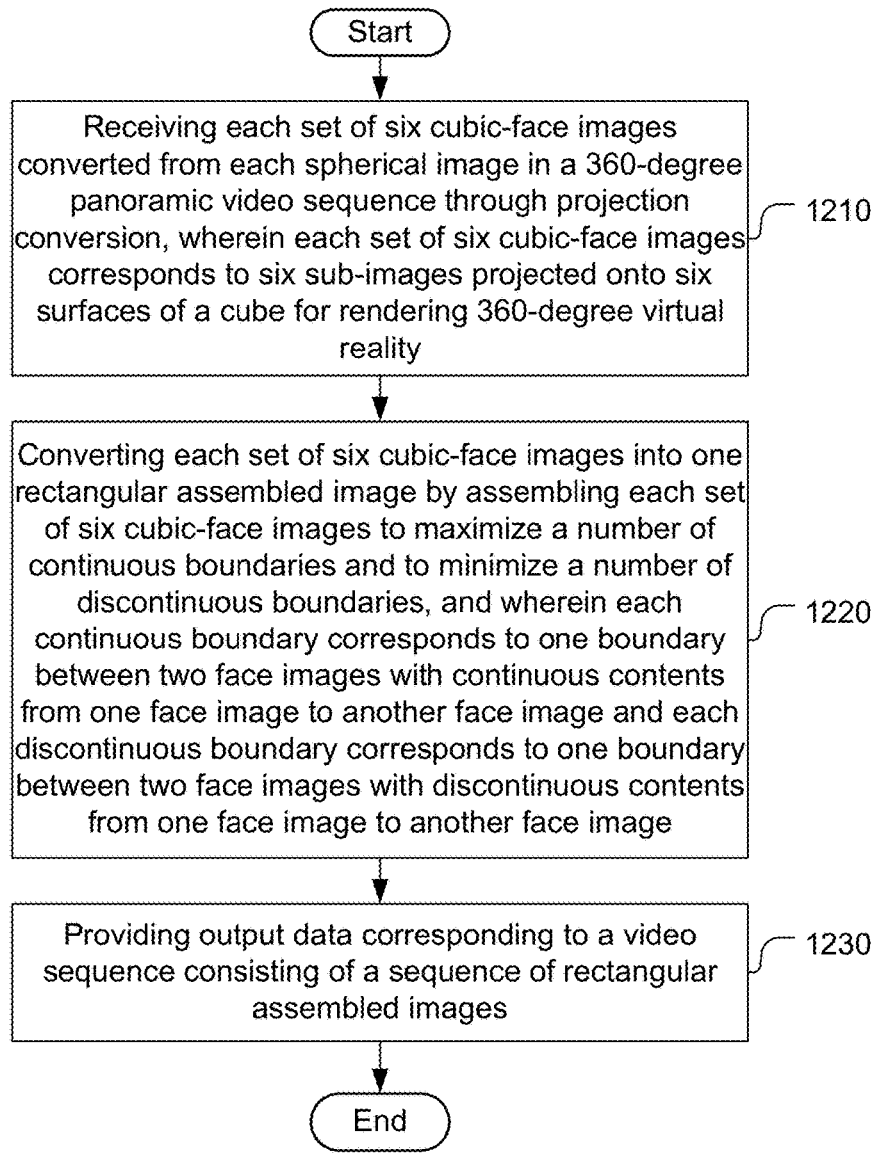
FIG. 12 illustrates an exemplary flowchart for a video processing system incorporating an embodiment of the present invention, where sets of six faces are converted into rectangular assembled images, each of which achieves a maximum number of continuous boundaries and a minimum number of discontinuous boundaries.

FIG. 12 illustrates an exemplary flowchart for a video processing system incorporating an embodiment of the present invention, where sets of six cubic-face images are converted into rectangular assembled images. According to this method, each set of six cubic-face images converted from each spherical image in a 360-degree panoramic video sequence through projection conversion is received in step 1210. As shown in FIG. 3A, the 360-degree panoramic video sequence can be generated from captured data by a 360-degree panoramic camera using stitching and calibration (110). Each spherical image is then mapped to a set of cubic-face images through projection conversion (120). The sets of cubic-face images are then used as input to the cubic face assembler (310). Each set of six cubic-face images corresponds to six sub-images projected onto six surfaces of a cube as shown in FIG. 2A for rendering 360-degree virtual reality. Each set of six cubic-face images is converted into one rectangular assembled image by assembling each set of six cubic-face images to maximize a number of continuous boundaries and to minimize a number of discontinuous boundaries in step 1220, where each continuous boundary corresponds to one boundary between two faces with continuous contents from one face to another face and each discontinuous boundary corresponds to one boundary between two faces with discontinuous contents from one face to another face. This type of cubic-face image assembly corresponds to the process 316 in FIG. 3B. FIG. 9A to FIG. 9K illustrate examples of generating connected images so that the continuous boundaries can be maximized. FIG. 11A to FIG. 11C illustrate examples of butting connected images to form rectangular assembled image so that the discontinuous boundaries can be minimized. Output data corresponding to a video sequence consisting of a sequence of rectangular assembled images are provided in step 1230. As shown in FIG. 3A, the video sequence consisting of rectangular assembled images can be outputted for further processing such as video encoding (130).

Figure 13:
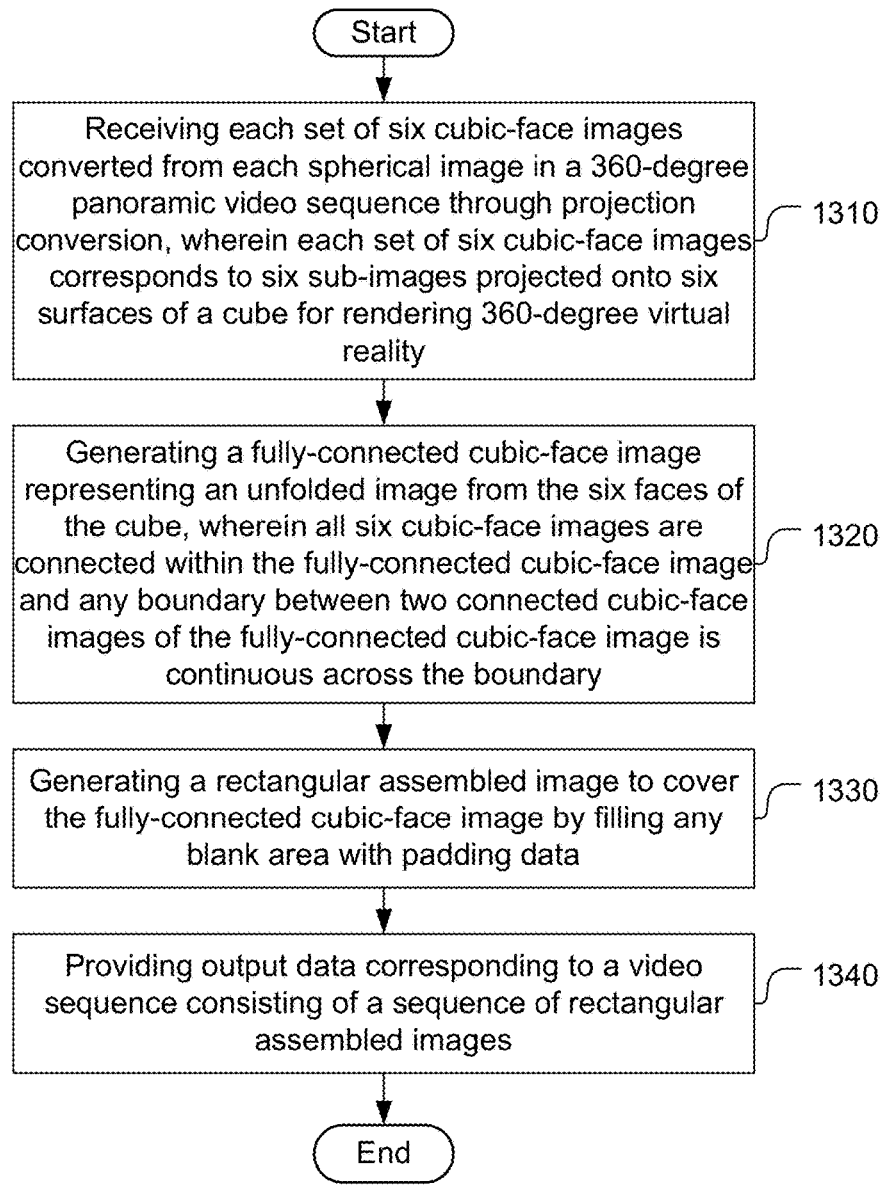
FIG. 13 illustrates an exemplary flowchart for a video processing system incorporating an embodiment of the present invention, where sets of six faces are converted into rectangular assembled images corresponding to fully-connected cubic-face images.

FIG. 13 illustrates an exemplary flowchart for a video processing system incorporating an embodiment of the present invention, where sets of six faces are converted into rectangular assembled images corresponding to fully-connected cubic-face images. According to this method, each set of six cubic faces converted from each spherical image in a 360-degree panoramic video sequence through projection conversion is received in step 1310. As shown in FIG. 3A, the 360-degree panoramic video sequence can be generated from captured data by a 360-degree panoramic camera using stitching and calibration (110). Each spherical image is then mapped to a set of cubic faces through projection conversion (120). A set of cubic faces is then used as input to the cubic face assembler (310). Each set of six cubic faces corresponds to six sub-images projected onto six surfaces of a cube as shown in FIG. 2A for rendering 360-degree virtual reality. A fully-connected cubic-face image representing an unfolded image from the six faces of the cube is generated in step 1320, where all six cubic faces are connected within the fully-connected cubic-face image and any boundary between two connected cubic faces of the fully-connected cubic-face image is continuous across the boundary. A rectangular assembled image to cover the fully-connected cubic-face image is generated by filling any blank area with padding data as shown in step 1330. This type of cubic-face image assembly corresponds to the process 314 in FIG. 3B. FIG. 7A to FIG. 7K illustrate examples of fully-connected cubic-face images. Output data corresponding to a video sequence consisting of a sequence of rectangular assembled images are provided in step 1340. As shown in FIG. 3A, the video sequence consisting of rectangular assembled images can be outputted for further processing such as video encoding (130).

The above flowcharts may correspond to software program codes to be executed on a computer, a mobile device, a digital signal processor or a programmable device for the disclosed invention. The program codes may be written in various programming languages such as C++. The flowchart may also correspond to hardware based implementation, where one or more electronic circuits (e.g. ASIC (application specific integrated circuits) and FPGA (field programmable gate array)) or processors (e.g. DSP (digital signal processor)).

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing cube face images, the method comprising:

receiving each set of six cubic-face images converted from each spherical image in a 360-degree panoramic video sequence through projection conversion, wherein each set of six cubic-face images corresponds to six sub-images projected from each spherical image onto six faces of a cube for rendering 360-degree virtual reality;

converting each set of six cubic-face images into one rectangular assembled image by assembling each set of six cubic-face images to maximize a number of continuous boundaries and to minimize a number of discontinuous boundaries, and wherein each continuous boundary corresponds to one boundary between two faces with continuous contents from one face to another face and each discontinuous boundary corresponds to one boundary between two faces with discontinuous contents from one face to another face; and providing output data corresponding to a video sequence consisting of a sequence of rectangular assembled images.

2. The method of claim 1, comprising applying video coding to the video sequence, wherein the output data comprises compressed data of the video sequence.

3. The method of claim 1, wherein the rectangular assembled image corresponds to a 6×1 assembled image, wherein the 6×1 assembled image consists of two 3×1 connected images, each 3×1 connected image has two continuous boundaries, and the 6×1 assembled image has one discontinuous boundary between the boundary of the two 3×1 connected images.

4. The method of claim 1, wherein the rectangular assembled image corresponds to a 1×6 assembled image, wherein the 1×6 assembled image consists of two 1×3 connected images, each 1×3 connected image has two continuous boundaries, and the 1×6 assembled image has one discontinuous boundary between the boundary of the two 1×3 connected images.

5. The method of claim 1, wherein the rectangular assembled image corresponds to a 3×2 assembled image, wherein the 3×2 assembled image consists of two 3×1 connected images butted at long edges of the 3×1 connected images, each 3×1 connected image has two continuous boundaries, and the 3×2 assembled image has three discontinuous boundaries between the boundary of the two 3×1 connected images.

6. The method of claim 1, wherein the rectangular assembled image corresponds to a 2×3 assembled image, wherein the 2×3 assembled image consists of two 1×3 connected images butted at long edges of the 1×3 connected images, each 3×1 connected image has two continuous boundaries, and the 2×3 assembled image has three discontinuous boundaries between the boundary of the two 1×3 connected images.

7. The method of claim 1, wherein said assembling each set of six cubic-face images comprises:
  unfolding each set of six cubic-face images into a connected net;
  rotating one or more cubic-face images of the connected net to form two connected size-3 images, three size-2 connected images, or one size-4 connected image plus two size-1 images, wherein size-3 image consists of three continuous face images and each size two image consists of two continuous face images; and
  assembling the two connected size-3 images or three size-2 connected images into one 6×1, 1×6, 3×2 or 2×3 rectangular assembled image, or the one size-4 connected image plus two size-1 images into one 6×1 or 1×6 rectangular assembled image.

8. An apparatus for processing cube face images, the apparatus comprising one or more electronic circuits or processor arranged to:
  receive each set of six cubic-face images converted from each spherical image in a 360-degree panoramic video sequence through projection conversion, wherein each set of six cubic-face images corresponds to six sub-images projected from each spherical image onto six faces of a cube for rendering 360-degree virtual reality;
  convert each set of six cubic-face images into one rectangular assembled image by assembling each set of six cubic-face images to maximize a number of continuous boundaries and to minimize a number of discontinuous boundaries, and wherein each continuous boundary corresponds to one boundary between two faces with continuous contents from one face to another face and each discontinuous boundary corresponds to one boundary between two faces with discontinuous contents from one face to another face; and
  provide output data corresponding to a video sequence consisting of a sequence of rectangular assembled images.

9. The apparatus of claim 8, wherein said one or more electronic circuits or processor are arranged to apply video coding to the video sequence, wherein the output data comprises compressed data of the video sequence.

10. The apparatus of claim 8, wherein the rectangular assembled image corresponds to a 6×1 assembled image, wherein the 6×1 assembled image consists of two 3×1 connected images, each 3×1 connected image has two continuous boundaries, and the 6×1 assembled image has one discontinuous boundary between the boundary of the two 3×1 connected images.

11. The apparatus of claim 8, wherein the rectangular assembled image corresponds to a 1×6 assembled image, wherein the 1×6 assembled image consists of two 1×3 connected images, each 1×3 connected image has two continuous boundaries, and the 1×6 assembled image has one discontinuous boundary between the boundary of the two 1×3 connected images.

12. The apparatus of claim 8, wherein the rectangular assembled image corresponds to a 3×2 assembled image, wherein the 3×2 assembled image consists of two 3×1 connected images butted at long edges of the 3×1 connected images, each 3×1 connected image has two continuous boundaries, and the 3×2 assembled image has three discontinuous boundaries between the boundary of the two 3×1 connected images.

13. The apparatus of claim 8, wherein the rectangular assembled image corresponds to a 2×3 assembled image, wherein the 2×3 assembled image consists of two 1×3 connected images butted at long edges of the 1×3 connected images, each 3×1 connected image has two continuous boundaries, and the 2×3 assembled image has three discontinuous boundaries between the boundary of the two 1×3 connected images.

14. The apparatus of claim 8, wherein each set of six cubic-face images is assembled by arranging said one or more electronic circuits or processor to:
  unfold each set of six cubic-face images into a connected net;
  rotate one or more cubic-face images of the connected net to form two connected size-3 images, three size-2 connected images, or one size-4 connected image plus two size-1 images, wherein size-3 image consists of three continuous face images and each size two image consists of two continuous face images; and
  assemble the two connected size-3 images or three size-2 connected images into one 6×1, 1×6, 3×2 or 2×3 rectangular assembled image, or the one size-4 connected image plus two size-1 images into one 6×1 or 1×6 rectangular assembled image.

15. A method of processing cube face images, the method comprising:
  receiving each set of six cubic faces converted from each spherical image in a 360-degree panoramic video sequence through projection conversion, wherein each set of six cubic faces corresponds to six sub-images projected from each spherical image onto six faces of a cube for rendering 360-degree virtual reality;
  generating a fully-connected cubic-face image representing an unfolded image from the six faces of the cube, wherein all six cubic faces are connected within the fully-connected cubic-face image and content within the two connected cubic faces of the fully-connected cubic-face image is continuous across the boundary;
  generating a rectangular assembled image to cover the fully-connected cubic-face image by filling any blank area with padding data; and
  providing output data corresponding to a video sequence consisting of a sequence of rectangular assembled images.

16. The method of claim 15, comprising applying video coding to the video sequence, wherein the output data comprises compressed data of the video sequence.

17. The method of claim 15, wherein the padding data have a constant value corresponding to one of 0, 2BitDepth−1 and 2BitDepth−1, where the BitDepth is the number of bits used to indicate each color component of a pixel.

18. An apparatus for processing cube face images, the apparatus comprising one or more electronic circuits or processor arranged to:
  receive each set of six cubic faces converted from each spherical image in a 360-degree panoramic video sequence through projection conversion, wherein each set of six cubic faces corresponds to six sub-images projected from each spherical image onto six faces of a cube for rendering 360-degree virtual reality;
  generate a fully-connected cubic-face image representing an unfolded image from the six faces of the cube, wherein all six cubic faces are connected within the fully-connected cubic-face image and content within the two connected cubic faces of the fully-connected cubic-face image is continuous across the boundary;
  generate a rectangular assembled image to cover the fully-connected cubic-face image by filling any blank area with padding data; and
  provide output data corresponding to a video sequence consisting of a sequence of rectangular assembled images.

19. The apparatus of claim 18, comprising applying video coding to the video sequence, wherein the output data comprises compressed data of the video sequence.

20. The apparatus of claim 18, wherein the padding data have a constant value corresponding to one of 0, 2BitDepth−1 and 2BitDepth−1, where the BitDepth is the number of bits used to indicate each color component of a pixel.

* * * * *